US009123348B2

(12) United States Patent
Yamada et al.

(10) Patent No.: US 9,123,348 B2
(45) Date of Patent: Sep. 1, 2015

(54) SOUND PROCESSING DEVICE

(75) Inventors: Makoto Yamada, Hamamatsu (JP); Kazunobu Kondo, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1493 days.

(21) Appl. No.: 12/617,605

(22) Filed: Nov. 12, 2009

(65) Prior Publication Data

US 2010/0125352 A1 May 20, 2010

(30) Foreign Application Priority Data

Nov. 14, 2008 (JP) ................................ 2008-292169

(51) Int. Cl.
*G06F 17/00* (2006.01)
*G10L 21/0272* (2013.01)
*H04R 3/00* (2006.01)
*G10L 21/0216* (2013.01)

(52) U.S. Cl.
CPC ... *G10L 21/0272* (2013.01); *G10L 2021/02165* (2013.01); *H04R 3/005* (2013.01)

(58) Field of Classification Search
CPC ... G10L 21/0272; G10L 21/028; G10L 15/16; G10L 25/30; G10L 2021/02165; G10L 2021/02166; H04H 60/58; H04R 3/005
USPC ................ 700/94, 95; 706/12; 704/233, 231; 702/196, 190; 381/92
See application file for complete search history.

(56) References Cited

U.S. PATENT DOCUMENTS

| | | | | |
|---|---|---|---|---|
| 8,144,896 | B2 * | 3/2012 | Liu et al. | 381/94.3 |
| 2003/0112234 | A1 * | 6/2003 | Brown et al. | 345/419 |
| 2004/0220800 | A1 * | 11/2004 | Kong et al. | 704/205 |
| 2006/0031067 | A1 * | 2/2006 | Kaminuma | 704/226 |

(Continued)

FOREIGN PATENT DOCUMENTS

| | | |
|---|---|---|
| EP | 1 748 588 A2 | 1/2007 |
| JP | 2006-084974 A | 3/2006 |

OTHER PUBLICATIONS

Notice of Reason for Rejection mailed Sep. 4, 2012, for JP Application No. 2008-292169, with English Translation, seven pages.

(Continued)

*Primary Examiner* — Vivian Chin
*Assistant Examiner* — Con P Tran
(74) *Attorney, Agent, or Firm* — Morrison & Foerster LLP

(57) ABSTRACT

A signal processing device processes a plurality of observed signals at a plurality of frequencies. The plurality of the observed signals are produced by a plurality of sound receiving devices which receive a mixture of a plurality of sounds. In the signal processing device, a storage stores observed data of the plurality of the observed signals. The observed data represents a time series of magnitude of each frequency in each of the plurality of the observed signals. An index calculator calculates an index value from the observed data for each of the plurality of the frequencies. The index value indicates significance of learning of a separation matrix using the observed data of each frequency. The separation matrix is used for separation of the plurality of the sounds from each other at each frequency. A frequency selector selects one or more frequency according to the index value of each frequency. A learning processor determines the separation matrix by learning with a given initial separation matrix using the observed data of the selected frequency.

14 Claims, 10 Drawing Sheets

(56) References Cited

U.S. PATENT DOCUMENTS

| | | | | |
|---|---|---|---|---|
| 2006/0058983 | A1* | 3/2006 | Araki et al. | 702/190 |
| 2007/0005350 | A1* | 1/2007 | Amada | 704/211 |
| 2007/0025564 | A1* | 2/2007 | Hiekata et al. | 381/94.2 |
| 2007/0083365 | A1* | 4/2007 | Shmunk | 704/232 |
| 2007/0133811 | A1* | 6/2007 | Hashimoto et al. | 381/22 |
| 2007/0133819 | A1* | 6/2007 | Benaroya | 381/94.1 |
| 2008/0027714 | A1* | 1/2008 | Hiekata et al. | 704/203 |
| 2008/0212666 | A1* | 9/2008 | Kuchi et al. | 375/231 |
| 2008/0228470 | A1* | 9/2008 | Hiroe | 704/200 |
| 2009/0006038 | A1* | 1/2009 | Jojic et al. | 702/190 |
| 2009/0214052 | A1* | 8/2009 | Liu et al. | 381/92 |
| 2009/0310444 | A1* | 12/2009 | Hiroe | 367/125 |
| 2010/0299144 | A1* | 11/2010 | Barzelay et al. | 704/233 |
| 2010/0324708 | A1* | 12/2010 | Ojanpera | 700/94 |

OTHER PUBLICATIONS

Osako, K. et al. (Mar. 10, 2008). "Blind Spatial Subtraction Array with Fast Near Point Source Cancellation Algorithm," Japan Acoustic Society, 2008, Spring Research Meeting, pp. 697-698, with English Prologue, three pages.

European Search Report dated Feb. 18, 2014 for EP Application No. 09014232, five pages.

Osako, K., et al. (Oct. 1, 2007). "Fast Convergence Blind Source Separation Based on Frequency Subband Interpolation by Null Beamforming," 2007 IEEE, Workshop on Applications of Signal Processing to Audio and Acoustics, Graduate School of Information Science, Nara Institute of Science and Technology, Nara, Japan, pp. 42-45.

Saitoh, D. et al. (Oct. 4, 2005). "Speech Extraction in a Car Interior using Frequency-Domain ICA with Rapid Filter Adaptations," Proceedings of Interspeech 2005, Nara Institute of Science and Technology, Nara, Japan, pp. 248-251, Retrieved from the Internet: <URL:http://library.naist.jp/dspace/bitstre_am/10061/8132/1/INTERSPEECH_2005_2301.pdf>, retrieved on Feb. 17, 2014.

European Examination Report dated Jan. 22, 2015, for EP Application No. 09014232.4, five pages.

Kondo, K. et al. (Jun. 9, 2009). "A Semi-blind Source Separation Method With a Less Amount of Computation Suitable for Tiny DSP Modules," 10th Annual Conference of the International Speech Communication Association, vol. 3 of 5 Brighton, United Kingdom, five pages.

* cited by examiner

FIG.5
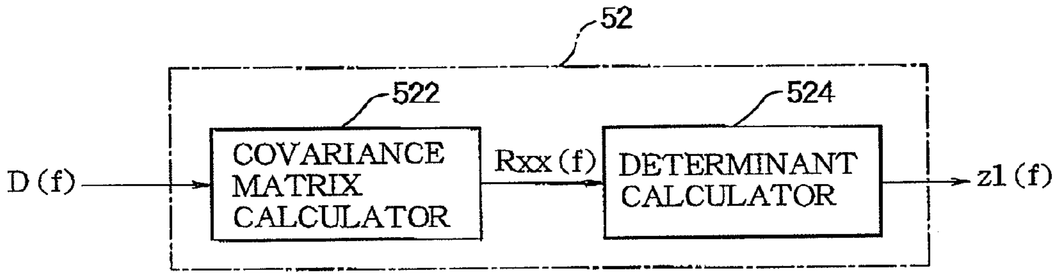
FIG.6 (A)
FIG.6 (B)
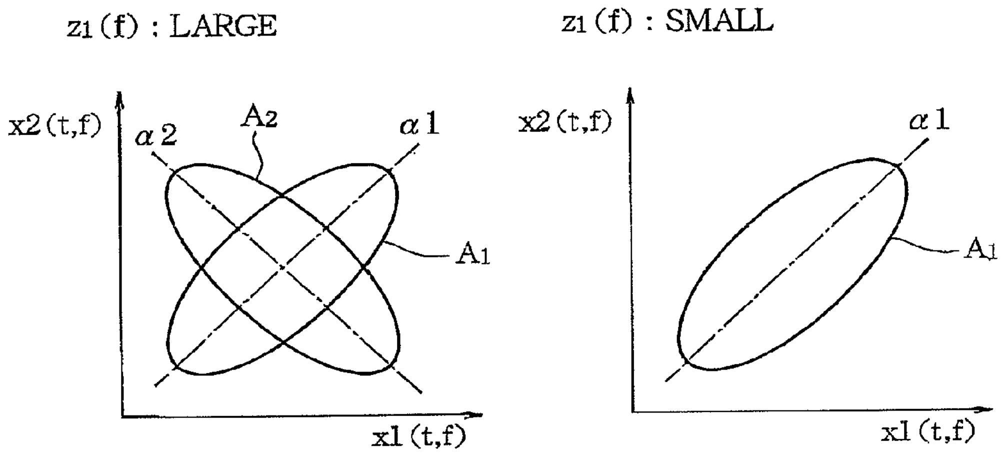

| NUMBER OF SELECTED FREQUENCIES | 512 | 200 | 150 | 100 | 50 |
|---|---|---|---|---|---|
| NOISE REDUCTION RATE (NRR) | 14.37 | 13.4 | 13.0 | 12.6 | 11.5 |
| CAPACITY OF STORAGE UNIT | 100% | 39% | 29% | 20% | 10% |

| | −90° | −45° | 45° | 90° |
|---|---|---|---|---|
| NINTH EMBODIMENT | 12.9 | 11.7 | 11.6 | 14.2 |
| COMPARISON | 11.8 | 11.0 | 11.3 | 13.8 |

SOUND PROCESSING DEVICE

BACKGROUND OF THE INVENTION

1. Technical Field of the Invention

The present invention relates to a technology for emphasizing (typically, separating or extracting) or suppressing a specific sound in a mixture of sounds.

2. Description of the Related Art

Each sound in a mixture of a plurality of sounds (voice or noise) emitted from separate sound sources is individually emphasized or suppressed by performing sound source separation on a plurality of observed signals that a plurality of sound receiving devices produce by receiving the mixture of the plurality of sounds. Learning according to Independent Component Analysis (ICA) is used to calculate a separation matrix used for sound source separation of the observed signals.

For example, a technology in which a separation matrix of each of a plurality of frequencies (or frequency bands) is learned using Frequency-Domain Independent Component Analysis (FDICA) is described in Japanese Patent Application Publication No. 2006-84898. Specifically, a time series of observed vectors of each frequency extracted from each observed signal is multiplied by a temporary separation matrix of the frequency to perform sound source separation, and the separation matrix is then repeatedly updated by learning so that the statistical independency between signals produced through sound source separation is maximized. A technology in which the amount of calculation is reduced by excluding (i.e., terminating learning of) frequencies, at which a small change is made to the accuracy of separation in the course of learning, from subsequent learning target frequencies is described in Japanese Patent Application Publication. No. 2006-84898.

However, FDICA requires a large-capacity storage unit that stores the time series of observed vectors of each of the plurality of frequencies. Although terminating the learning of separation matrices of frequencies at which the accuracy of separation undergoes little change reduces the amount of calculation, the technology of Japanese Patent Application Publication No. 2006-84898 requires a large-capacity storage unit to store the time series of observed vectors for all frequencies since learning of the separation matrix is performed for every frequency when the learning is initiated.

SUMMARY OF THE INVENTION

In view of these circumstances, an object of the invention is to reduce the capacity of storage required to generate (or learn) separation matrices.

To achieve the above object, a signal processing device according to the invention processes a plurality of observed signals at a plurality of frequencies, the plurality of the observed signals being produced by a plurality of sound receiving devices which receive a mixture of a plurality of sounds (such as voice or (non-vocal) noise). The inventive signal processing device comprises: a storage unit that stores observed data of the plurality of the observed signals, the observed data representing a time series of magnitude (amplitude or power) of each frequency in each of the plurality of the observed signals; an index calculation unit that calculates an index value from the observed data for each of the plurality of the frequencies, the index value indicating significance of learning of a separation matrix using the observed data of each frequency, the separation matrix being used for separation of the plurality of the sounds; a frequency selection unit that selects at least one frequency from the plurality of the frequencies according to the index value of each frequency calculated by the index calculation unit; and a learning processing unit that determines the separation matrix by learning with a given initial separation matrix using the observed data of the frequency selected by the frequency selection unit among the plurality of the observed data stored in the storage unit.

According to this configuration, observed data of unselected frequencies is not subjected to learning by the learning processing unit since learning of the separation matrix is selectively performed only for frequencies at which the significance or efficiency of learning using observed data is high. Accordingly, there is an advantage in that the capacity of the storage unit required to generate the respective separation matrices of the frequencies and the amount of processing required for the learning processing unit are reduced.

Since the learning of the separation matrix is equivalent to a process for specifying a number of independent bases as same as the number of sound sources, the total number of bases in a distribution of observed vectors, each including, as elements, respective magnitudes of a corresponding frequency in the plurality of observed signals is preferably used as an index indicating the significance of learning using observed data.

Therefore, in a preferred embodiment of the invention, the index calculation unit calculates an index value representing a total number of bases in a distribution of observed vectors obtained from the observed data, each observed vector including, as elements, respective magnitudes of a corresponding frequency in the plurality of the observed signals, and the frequency selection unit selects one or more frequency at which the total number of the bases represented by the index value is larger than total number of bases represented by index values at other frequencies.

For example, a determinant or a number of conditions of a covariance matrix of the observed vector is preferably used as the index value indicating the total number of bases. In a configuration where the determinant of the covariance matrix is used, the index calculation unit calculates a first determinant corresponding to product of a first number of diagonal elements (for example, n diagonal elements) among a plurality of diagonal elements of a singular value matrix specified through singular value decomposition of the covariance matrix of the observed vectors, and a second determinant corresponding to product of a second number of the diagonal elements (for example, n−1 diagonal elements), which are fewer in number than the first number of the diagonal elements, among the plurality of diagonal elements, and the frequency selection unit sequentially performs frequency selection using the first determinant and frequency selection using the second determinant.

There is a tendency that the significance of learning using observed data increases as independency between a plurality of observed signals increases (i.e., as the correlation therebetween decreases). Therefore, in a preferred embodiment of the invention, the index calculation unit calculates an index value representing independency between the plurality of the observed signals at each frequency, and the frequency selection unit selects one or more frequency at which the independency represented by the index value is higher than independencies calculated at other frequencies. For example, a correlation between the plurality of the observed signals or an amount of mutual information of the plurality of the observed signals is preferably used as the index value of the independency between the plurality of the observed signals.

Taking into consideration a tendency that regions (bases) in which observed vectors are distributed is more clearly specified as the trace (power) of the covariance matrix of the observed vectors increases, it is preferable to employ a configuration in which the frequency selection unit selects a frequency at which the trace of the covariance matrix of the plurality of observed signals is great. In addition, taking into consideration a tendency that an observed signal includes a greater number of sounds from a greater number of sound sources as the kurtosis of a frequence distribution of the magnitude of the observed signal decreases, it is preferable to employ a configuration in which the frequency selection unit selects a frequency at which the kurtosis of the frequence distribution of the magnitude of the observed signal is lower than kurtoses at other frequencies.

In a specific example configuration where an initial value generation unit is provided for generating an initial separation matrix for each of the plurality of the frequencies, the learning processing unit generates the separation matrix of the frequency selected by the frequency selection unit through learning using the initial separation matrix of the selected frequency as an initial value, and uses the initial separation matrix of a frequency not selected by the frequency selection unit as a separation matrix of the frequency that is not selected. According to this configuration, it is possible to easily prepare separation matrices of unselected frequencies.

However, when the initial separation matrix is not appropriate, there is a possibility that the accuracy of sound source separation using the separation matrix is reduced. Therefore, in a preferred embodiment of the invention, the signal processing device further comprises a direction estimation unit that estimates a direction of a sound source of each of the plurality of the sounds from the separation matrix generated by the learning processing unit; and a matrix supplementation unit that generates a separation matrix of a frequency not selected by the frequency selection unit from the direction estimated by the direction estimation unit. In this configuration, since the separation matrix of the unselected frequency is generated (supplemented) from the separation matrix learned by the learning processing unit, there is an advantage in that accurate sound source separation is also achieved for unselected frequencies.

However, it is difficult to accurately estimate the direction of each sound source from the separation matrices of lower-band-side frequencies or higher-band-side frequencies.

Accordingly, it is preferable to employ a configuration in which the direction estimation unit estimates a direction of a sound source of each of the plurality of the sounds from the separation matrix that is generated by the learning processing unit for a frequency excluding at least one of a frequency at lower-band-side and a frequency at higher-band-side among the plurality of the frequencies.

In a preferred embodiment of the invention, the index calculation unit sequentially calculates, for each unit interval of the sound signals, an index value of each of the plurality of the frequencies, and the frequency selection unit comprises: a first selection unit that sequentially determines, for each unit interval, whether or not to select each of the plurality of the frequencies according to an index value of the unit interval; and a second selection unit that selects the at least one frequency from results of the determination of the first selection unit for a plurality of unit intervals. In this embodiment, since frequencies are selected from the results of the determination of the first selection unit for a plurality of unit intervals, whether or not to select frequencies is reliably determined even when observed data changes (for example, when noise is great), compared to the configuration in which frequencies are selected from the index value of only one unit interval. Accordingly, there is an advantage in that the separation matrix is accurately learned.

In a more preferred embodiment, the first selection unit sequentially generates, for each unit interval, a numerical value sequence indicating whether or not each of the plurality of the frequencies is selected, and the second selection unit selects the at least one frequency based on a weighted sum of respective numerical value sequences of the plurality of the unit intervals. In this embodiment, since frequencies are selected from a weighted sum of respective numerical value sequences of the plurality of unit intervals, there is an advantage in that whether or not to select frequencies can be determined preferentially taking into consideration the index value of a specific unit interval among the plurality of unit intervals (i.e., preferentially taking into consideration the results of determination of whether or not to select frequencies).

The signal processing device according to each of the above embodiments may not only be implemented by hardware (electronic circuitry) such as a Digital Signal Processor (DSP) dedicated to audio processing but may also be implemented through cooperation of a general arithmetic processing unit such as a Central Processing Unit (CPU) with a program.

A program is provided according to the invention for use in a computer having a processor for processing a plurality of observed signals at a plurality of frequencies, the plurality of the observed signals being produced by a plurality of sound receiving devices which receive a mixture of a plurality of sounds, and a storage that stores observed data of the plurality of the observed signals, the observed data representing a time series of magnitude of each frequency in each of the plurality of the observed signals. The program is executed by the processor to perform: an index calculation process for calculating an index value from the observed data for each of the plurality of the frequencies, the index value indicating significance of learning of a separation matrix using the observed data of each frequency, the separation matrix being used for separation of the plurality of the sounds; a frequency selection process for selecting at least one frequency from the plurality of the frequencies according to the index value of each frequency calculated by the index calculation process; and a learning process for determining the separation matrix by learning with a given initial separation matrix using the observed data of the frequency selected by the frequency selection process among the plurality of the observed data stored in the storage.

This program achieves the same operations and advantages as those of the signal processing device according to the invention. The program of the invention may be provided to a user through a computer machine readable recording medium storing the program and then installed on a computer and may also be provided from a server device to a user through distribution over a communication network and then installed on a computer.

BRIEF DESCRIPTION OF THE DRAWINGS

FIG. 5 is a block diagram of an index calculator.

FIGS. 6(A) and 6(B) are a conceptual diagram illustrating a relation between the determinant of a covariance matrix and the total number of bases in a distribution of observed vectors.

FIGS. 10(A) and 10(8) are a conceptual diagram illustrating a relation between the trace of a covariance matrix and the pattern of distribution of observed vectors.

DETAILED DESCRIPTION OF THE INVENTION

<A: First Embodiment>

Figure 1:
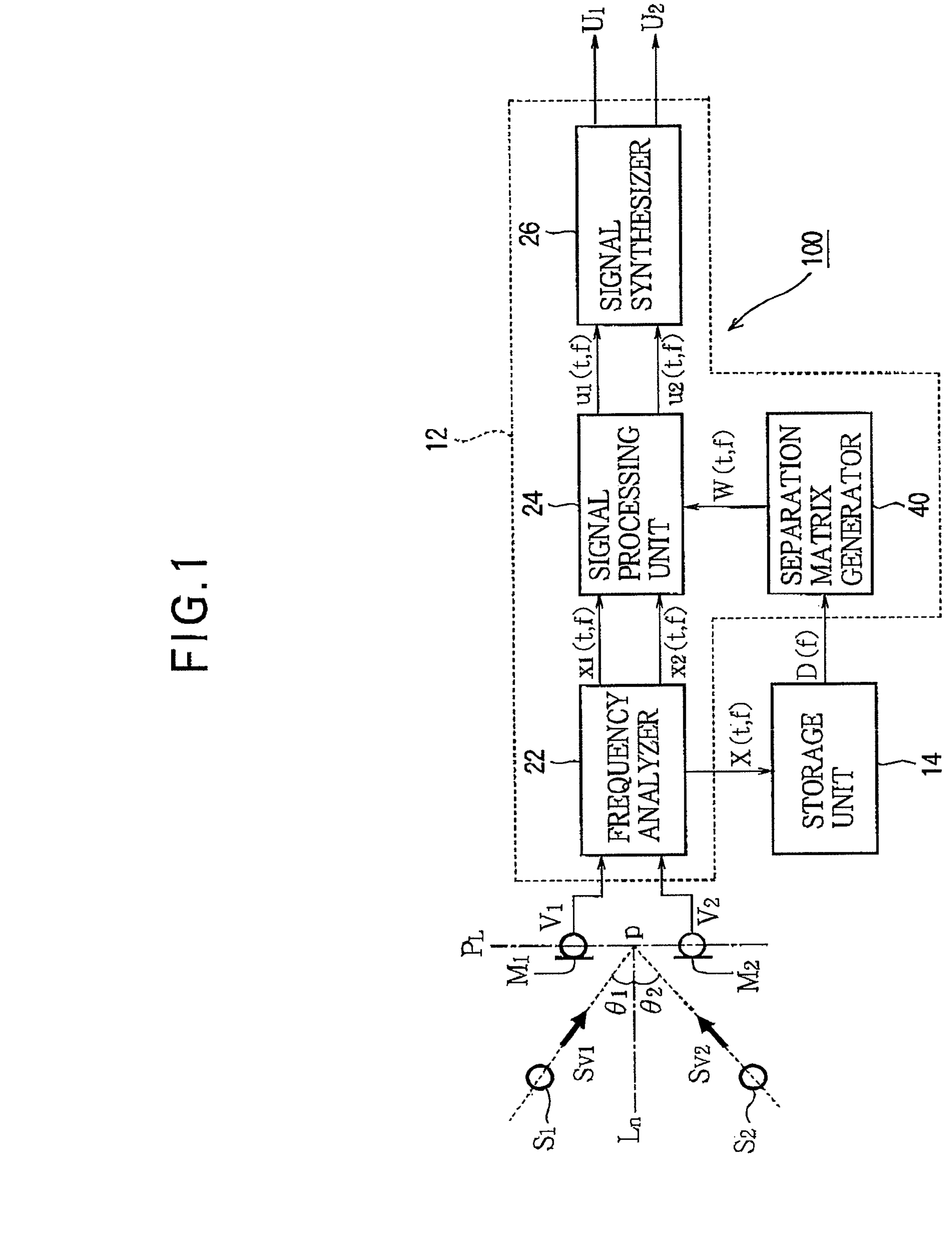
FIG. 1 is a block diagram of a signal processing device according to a first embodiment of the invention.

FIG. 1 is a block diagram, of a signal processing device associated with a first embodiment of the invention. An n number of sound receiving devices M which are located at intervals in a plane PL are connected to a signal processing device 100, where n is a natural number equal to or greater than 2. In the first embodiment, it is assumed that two sound receiving devices M1 and M2 are connected to the signal processing device 100 (i.e., n=2). An n number of sound sources S (S1, S2) are provided at different positions around the sound receiving device M1 and the sound receiving device M2. The sound source S1 is located in a direction at an angle of θ1 with respect to the normal Ln to the plane PL and the sound source S2 is located in a direction at an angle of θ2 (θ2≠θ1) with respect to the normal Ln.

A mixture of a sound SV1 emitted from the sound source S1 and a sound SV2 emitted from the sound source S2 arrives at the sound receiving device M1 and the sound receiving device M2. The sound receiving device M1 and the sound receiving device M2 are microphones that generate observed signals V (V1, V2) representing a waveform of the mixture of the sound SV1 from the sound source S1 and the sound SV2 from the sound source S2. The sound receiving device M1 generates the observed signal V1 and the sound receiving device M2 generates the observed signal V2.

The signal processing device 100 performs a filtering process (for sound source separation) on the observed signal V1 and the observed signal V2 to generate a separated signal U1 and a separated signal U2. The separated signal U1 is an audio signal obtained by emphasizing the sound SV1 from the sound source S1 (i.e., obtained by suppressing the sound SV2 from the sound source S2) and the separated signal U2 is an audio signal obtained by emphasizing the sound SV2 from the sound source S2 (i.e., obtained by suppressing the sound SV1). That is, the signal processing device 100 performs sound source separation to separate the sound SV1 of the sound source S1 and the sound SV2 of the sound source S2 from each other (sound source separation).

The separated signal U1 and the separated signal U2 are provided to a sound emitting device (for example, speakers or headphones) to be reproduced as audio. This embodiment may also employ a configuration in which only one of the separated signal U1 and the separated signal U2 is reproduced (for example, a configuration in which the separated signal U2 is discarded as noise). An A/D converter that converts the observed signal V1 and the observed signal V2 into digital signals and a D/A converter that converts the separated signal U1 and the separated signal U2 into analog signals are not illustrated for the sake of convenience.

As shown in FIG. 1, the signal processing device 100 is implemented as a computer system including an Arithmetic processing unit 12 and a storage unit 14. The storage unit 14 is a machine readable medium that stores a program and a variety of data for generating the separated signal U1 and the separated signal U2 from the observed signal V1 and the observed Signal V2. A known machine readable recording medium such as a semiconductor recording medium or a magnetic recording medium is arbitrarily employed as the storage unit 14.

The arithmetic processing unit 12 functions as a plurality of components (for example, a frequency analyzer 22, a signal processing unit 24, a signal synthesizer 26, and a separation matrix generator 40) by executing the program stored in the storage unit 14. This embodiment may also employ a configuration in which an electronic circuit (DSP) dedicated to processing observed signals V implements each of the components of the arithmetic processing unit 12 or a configuration in which each of the components of the arithmetic processing unit 12 is mounted in a distributed manner on a plurality of integrated circuits.

The frequency analyzer 22 calculates frequency spectrums Q (i.e., a frequency spectrum Q1 of the observed signal V1 and a frequency spectrum Q2 of the observed signal V2) for each of a plurality of frames into which the observed signals V (V1, V2) are divided in time. For example, short-time Fourier transform may be used to calculate each frequency spectrum Q.

Figure 2:
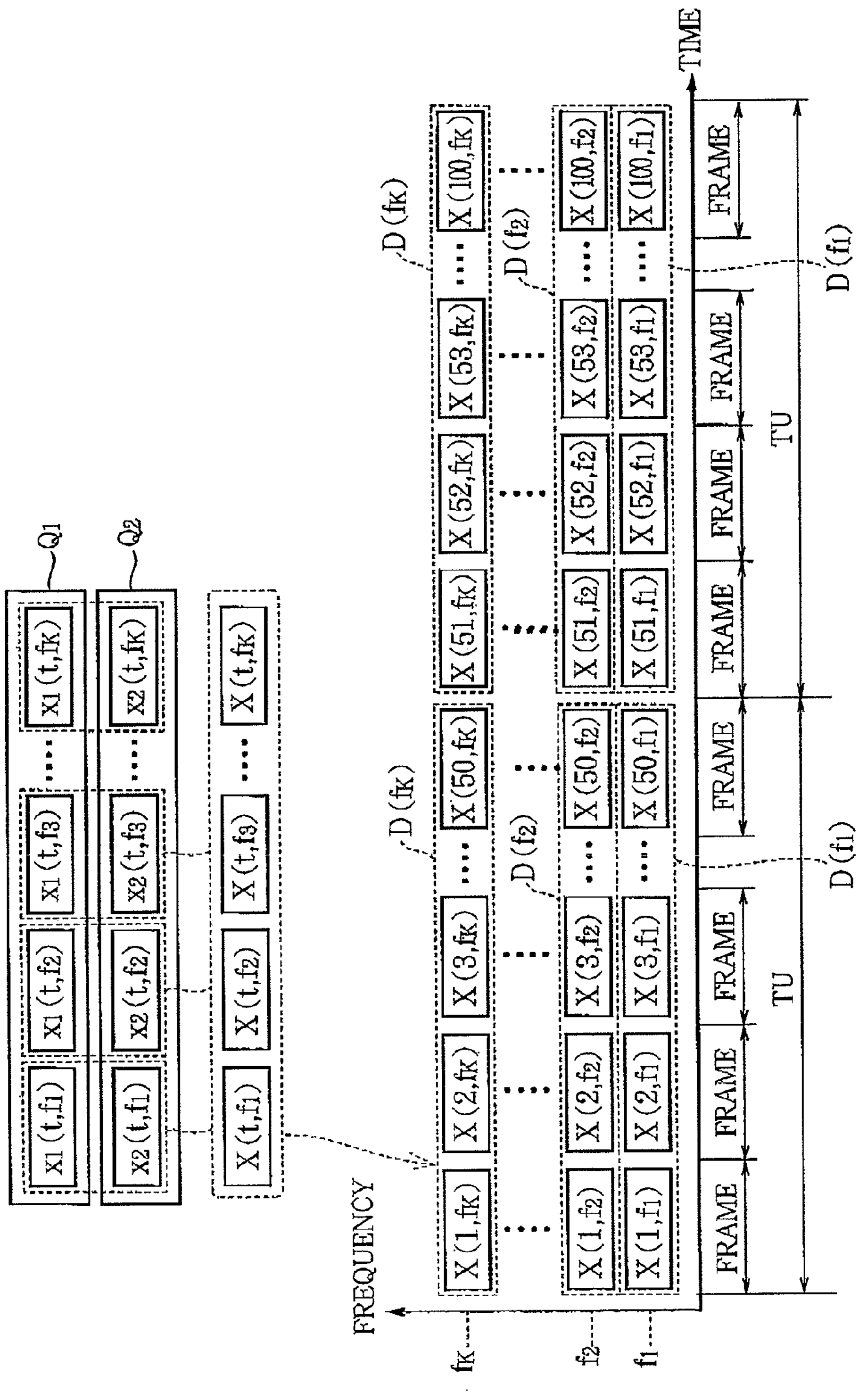
FIG. 2 is a conceptual diagram illustrating details of observed data.

As shown in FIG. 2, the frequency spectrum Q1 of one frame identified by a number (time) t is calculated as a set of respective magnitudes x1(t, f1) to x1(t, fK) of K frequencies f1 to fK set on the frequency axis. Similarly, the frequency spectrum Q2 is calculated as a set of respective magnitudes x2(t, f1) to x2(t, fK) of the K frequencies f1 to fK.

The frequency analyzer 22 generates observed vectors X (t, f1) to X(t, fK) of each frame for the K frequencies f1 to fK. As shown in FIG. 2, the observed vector X (t, fk) of the frequency fk of the kth number (k=1−K) is a vector whose elements are the magnitude x1(t, fk) of the frequency fk in the frequency spectrum Q1 and the magnitude x2(t, fk) of the frequency fk in the frequency spectrum Q2 of the common frame (i.e., $X(t, fk)=[x1(t, fk)^{*}x2(t, fk)^{*}]^{H}$), where the symbol * denotes complex conjugate and the symbol H denotes (Hermitian) matrix transposition. The observed vectors X (t, f1) to X(t, fK) that the frequency analyzer 22 generates for each frame are stored in the storage unit 14.

The observed vectors X (t, f1) to X(t, fK) stored in the storage unit 14 are divided into observed data D(f1) to D(fK) of unit intervals TU, each including a predetermined number of (for example, 50) frames as shown in FIG. 2. The observed data D(fk) of the frequency fk is a time series of the observed vector X (t, fk) of the frequency fk calculated for each frame of the unit interval TU.

The signal processing unit 24 of FIG. 1 sequentially generates a magnitude u1(t, fk) and a magnitude u2(t, fk) for each frame by performing a filtering process (or sound source separation) on the magnitude x1(t, fk) and the magnitude x2(t, fk) calculated by the frequency analyzer 22. The signal synthesizer 26 converts the magnitudes u1(t, f1) to u1(t, fK) generated by the signal processing unit 24 into a time-domain signal and connects adjacent frames to generate a separated signal U1. In similar manner, the signal synthesizer 26 converts the magnitudes u2(t, f1) to u2(t, fK) into a time-domain signal and connects adjacent frames to generate a separated signal U2.

Figure 3:
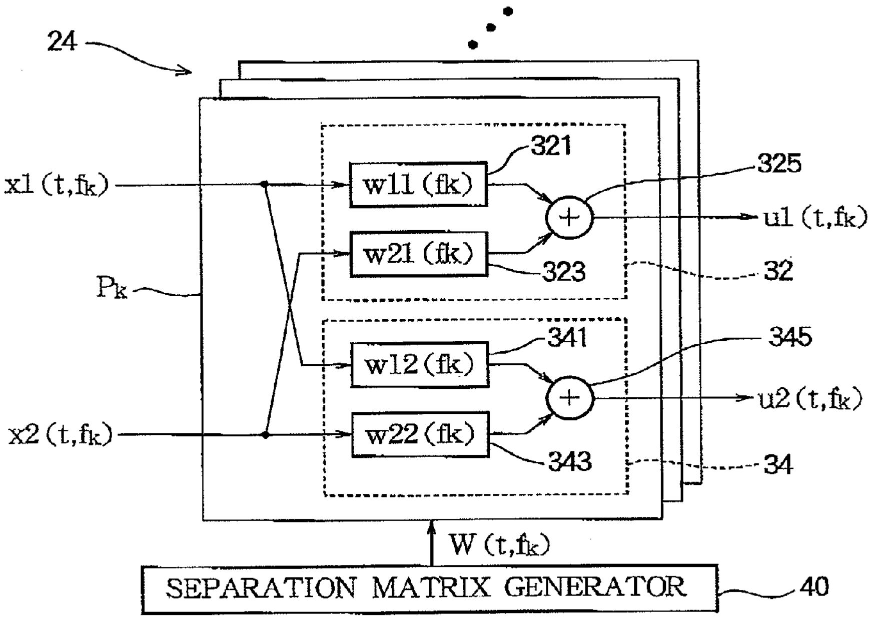
FIG. 3 is a block diagram of a signal processing unit.

FIG. 3 is a block diagram of the signal processing unit 24. As shown in FIG. 3, the signal processing unit 24 includes K processing units P1 to PK corresponding respectively to the K frequencies f1 to fK. The processing unit Pk corresponding to the frequency fk includes a filter 32 that generates the magnitude u1(t, fk) from the magnitude x1(t, fk) and the magnitude x2(t, fk) and a filter 34 that generates the magnitude u2(t, fk) from the magnitude x1(t, fk) and the magnitude x2(t, fk).

A Delay-Sum (DS) type beam-former is used for each of the filter 32 and the filter 34. Specifically, as defined in Equation (1a), the filter 32 of the processing unit Pk includes a delay element 321 that adds delay according to a coefficient w11(fk) to the magnitude x1(t, fk), a delay element 323 that adds delay according to a coefficient w21(fk) to the magnitude x2(t, fk), and an adder 325 that sums an output of the delay element 321 and an output of the delay element 323 to generate the magnitude u1(t, fk) of the separated signal U1. Similarly, as defined in Equation (1b), the filter 34 of the processing unit Pk includes a delay element 341 that adds delay according to a coefficient w12(fk) to the magnitude x1(t, fk), a delay element 343 that adds delay according to a coefficient w22(fk) to the magnitude x2(t, fk), and an adder 345 that sums an output of the delay element 341 and an output of the delay element 343 to generate the magnitude u2(t, fk) of the separated signal U2.

$$u1(t,fk)=w11(fk)\cdot x1(t,fk)+w21(fk)\cdot x2(t,fk) \tag{1a}$$

$$u2(t,fk)=w12(fk)\cdot x1(t,fk)+w22(fk)\cdot x2(t,fk) \tag{1b}$$

The separation matrix generator 40 shown in FIGS. 1 and 3 generates separation matrices W(f1) to W(fK) used by the signal processing unit 24. The separation matrix W(fk) of the frequency fk is a matrix of 2 rows and 2 columns (n rows and n columns in general form) whose elements are the coefficients w11(fk) and w21(fk) applied to the filter 32 of the processing unit Pk and the coefficients w12(fk) and w22(fk) applied to the filter 34 of the processing unit Pk. The separation matrix generator 40 generates the separation matrix W(fk) from the observed data D(fk) stored in the storage unit 14. That is, the separation matrix W(fk) is generated in each unit interval TU for each of the K frequencies f1 to fK.

Figure 4:
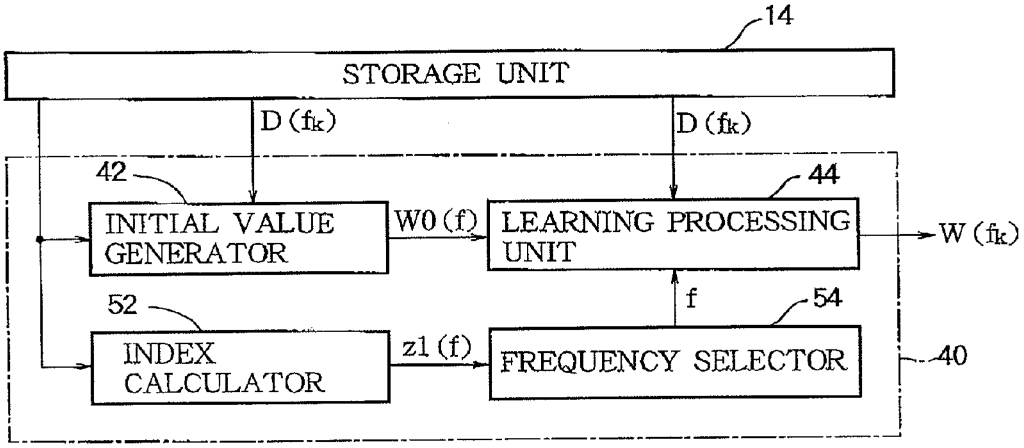
FIG. 4 is a block diagram of a separation matrix generator.

FIG. 4 is a block diagram of the separation matrix generator 40. As shown in FIG. 4, the separation matrix generator 40 includes an initial value generator 42, a learning processing unit 44, an index calculator 52, and a frequency selector 54. The initial value generator 42 generates respective initial separation matrices W0(f1) to W0(fK) for the K frequencies f1 to fK. The initial separation matrix W0(fk) corresponding to the frequency fk is generated for each unit interval TU using the observed data D(fk) stored in the storage unit 14. Any known technology is used to generate the initial separation matrices W0(f1) to W0(1K).

For example, to specify the initial separation matrices W0(f1) to W0(fK), this embodiment preferably uses a partial space method such as second-order static ICA or main component analysis described in K. Tachibana, et al., "Efficient Blind Source Separation Combining Closed-Form Second-Order ICA and Non-Closed-Form Higher-Order ICA," International Conference on Acoustics, Speech, and Signal Processing (ICASSP), Vol. 1, pp. 45-48, April 2007 or an adaptive beam-former described in Patent No. 3949074. This embodiment may also employ a method in which the initial separation matrices W0(f1) to W0(fK) are specified using a variety of beam-formers (for example, adaptive beam-formers) from the directions of sound sources S estimated using a minimum variance method, or a multiple signal classification (MUSIC) method or the initial separation matrices W0(f1) to W0(fK) are specified from canonical vectors specified using canonical correlation analysis or a factor vector specified using factor analysis.

The learning processing unit 44 of FIG. 4 generates separation matrices W(fk) (W(f1) to W(fK)) by performing sequential learning on each of the K frequencies f1 to fK using the initial separation matrix W0(fk) as an initial value. The observed data D(fk) of the frequency fk stored in the storage unit 14 is used to learn the separation matrix W(fk). For example, an independent component analysis (for example, high-order ICA) scheme in which the separation matrix W(fk) is repeatedly updated so that the separated signal U1 (which is a time series of the magnitude u1 in Equation (1a)) and the separated signal U2 (which is a time series of the magnitude u2 in Equation (1b)), which are separated from the observed data D(fk) using the separation matrix W(fk), are statistically independent of each other is preferably used to generate the separation matrix W(fk).

However, there is a possibility that the number of arithmetic operations required to calculate the final separation matrices W(f1) to W(fK), the capacity of the storage unit 14 required to store data created or used in the course of learning, and the like are excessive in the configuration in which the learning processing unit 44 performs learning of the separation matrices W(f1) to W(fK) for the K frequencies f1 to fK. Thus, in the first embodiment, the learning processing unit 44 performs learning of the separation matrix W(fk) using the observed data D(fk) for one or more frequencies fk, in which the significance and efficiency of learning of the separation matrix W(fk) using the observed data D(fk) is high (i.e., the degree of improvement of the accuracy of sound source separation through learning of the separation matrix W(fk), compared to when the initial separation matrix W0(fk) is used, is high), among the K frequencies f1 to fK.

The index calculator 52 of FIG. 4 calculates an index value that is used as a reference for selecting the frequencies (fk). The index calculator 52 of the first embodiment calculates a determinant z1(fk) (z1(f1) to z1(fK)) of a covariance matrix Rxx(fk) of the observed data D(fk) (i.e., of the observed signal V1 and the observed signal V2) for each of the K frequencies f1 to fK. As shown in FIG. 5, the index calculator 52 includes a covariance matrix calculator 522 and a determinant calculator 524.

The covariance matrix calculator 522 calculates a covariance matrix Rxx(fk) (Rxx(f1) to Rxx(fK)) of the observed data D(fk) for each of the K frequencies f1 to fK. The covariance matrix Rxx(fk) is a matrix whose elements are covariances of the observed vectors X(t, fk) in the observed data D(fk) (in the unit interval TU). Thus, the covariance matrix Rxx(fk) is defined, for example, using the following Equation (2). Here, it is assumed that the sum of observed vectors X(t, fk) of all frames in the unit interval TU is a zero matrix (i.e., zero average) as represented by the following Equation (3).

$$\begin{aligned} Rxx(fk) &= E[X(t, fk)X(t, fk)^H] \\ &= \Sigma\_\{t\}X(t, f)X(t, f)^H) \end{aligned} \tag{2}$$

$$E[X(t, fk)] = [E[x1(t, fk)]E[x2(t, fk)]]^H = [0 \quad 0]^H \tag{3}$$

The symbol E in Equations (2) and (3) denotes the expectation (or sum) and the symbol $\Sigma\_(t)$ denotes the sum (or average) over a plurality of (for example, 50) frames in the unit interval TU. That is, the covariance matrix Rxx(fk) is a matrix of n rows and n columns obtained by summing the products of the observed vectors X(t, fk) and the transposes of the observed vectors X(t, fk) over a plurality of observed vectors X(t, fk) in the unit interval TU (i.e., in the observed data D(fk)).

The determinant calculator 524 calculates respective determinants z1(fk) (z1(f1) to z1(fK)) for the K covariance matrices Rxx(f1) to Rxx(fK) calculated by the covariance matrix calculator 522. Although any known method may be used to calculate each determinant z1(fk), this embodiment preferably employs, for example, the following method using singular value decomposition of the covariance matrix Rxx(fk).

Each covariance matrix Rxx(fk) is singular-value-decomposed as represented by the following Equation (4). A matrix F in Equation (4) is an orthogonal matrix of n rows and n columns (2 rows and 2 columns in this embodiment) and a matrix D is a singular value matrix of n rows and n columns in which all elements other than diagonal elements d1, . . . , dn are zero.

$$Rxx(fk)=FDF^H \quad (4)$$

Accordingly, the determinant z1(fk) of the covariance matrix Rxx(fk) is represented by the following Equation (5). A relation ($F^HF=I$) that the product of the transpose $F^H$ of a matrix F and the matrix F is an n-order unit matrix and a relation that the determinant det (AB) of a matrix AB is equal to the determinant det (BA) of a matrix BA are used to derive Equation (5).

$$\begin{aligned} z1(fk) &= \det(Rxx(fk)) \quad (5) \\ &= \det(FDF^H) \\ &= \det(D) \\ &= d1 \cdot d2 \cdot \ldots \cdot dn \end{aligned}$$

As is understood from Equation (5), the determinant z1(fk) of the covariance matrix Rxx(fk) corresponds to the product of the n diagonal elements (d1, . . . , dn) of the singular value matrix D specified through singular value decomposition of the covariance matrix Rxx(fk). The determinant calculator 524 calculates determinants z1(f1) to z1(fK) by performing the calculation of Equation (5) for each of the K frequencies f1 to fK.

FIGS. 6(A) and 6(B) are scatter diagrams of observed vectors X (t, fk) in a unit interval TU. Here, the horizontal axis represents the magnitude x1(t, fk) and the vertical axis represents the magnitude x2(t, fk). FIG. 6(A) is a scatter diagram when the determinant z1(fk) is great and FIG. 6(B) is a scatter diagram when the determinant z1(fk) is small.

As shown in FIG. 6(A), an axis line (basis) of a region in which the observed vectors X(t, fk) are distributed is clearly discriminated for each sound source S when the determinant z1(fk) of the covariance matrix Rxx(fk) is great. Specifically, a region A1 in which observed vectors X(t, fk), where the sound SV1 from the sound source S1 is dominant, are distributed along an axis line α1 and a region A2 in which observed vectors X(t, fk), where the sound SV2 from the sound source S2 is dominant, are distributed along an axis line a2 are clearly discriminated. On the other hand, when the determinant z1(fk) of the covariance matrix Rxx(fk) is small, the number of regions (or the number of axis lines) in which observed vectors X(t, fk) are distributed, which can be clearly discriminated in a scatter diagram, is less than the total number of actual sound sources S. For example, a definite region A2 (axis line α2) corresponding to the sound SV2 from the sound source S2 is not present as shown in FIG. 6(B).

As is understood from the above tendency, the determinant z1(fk) of the covariance matrix Rxx(fk) serves as an index indicating the total number of bases of distributions of observed vectors X(t, fk) included in the observed data D(fk) (i.e., the total number of axis lines of regions in which the observed vectors X(t, fk) are distributed). That is, there is a tendency that the number of bases of a frequency fk increases as the determinant z1(fk) of the frequency fk increases. Only one independent basis is present at a frequency fk at which the determinant z1(fk) is zero.

Since independent component analysis applied to learning of the separation matrix W(fk) through the learning processing unit 44 is equivalent to a process for specifying the number of independent bases as same as the number of sound sources S, it can be considered that the significance of learning of observed data D(fk) (i.e., the degree of improvement of the accuracy of sound source separation through learning of the separation matrix W(fk)) is small at a frequency fk, at which the determinant z1(fk) of the covariance matrix Rxx (fk) is small, among the K frequencies f1 to fK. That is, even when the separation matrix W(fk) is generated through learning, by the learning processing unit 44, of only frequencies fk at which the determinant z1(fk) is large among the K frequencies f1 to fK (i.e., when, for example, the initial separation matrix W0(fk) is used as the separation matrix W(fk) without learning at each frequency fk at which the determinant z1(fk) is small), it is possible to perform sound source separation with almost the same accuracy as when the separation matrices W(f1) to W(fK) are specified through learning of all observed data D(f1) to D(fK) of the K frequencies f1 to fK. Thus, it is possible to use the determinant z1(fk) as an index value of the significance of learning of the separation matrix W(fk) using the observed data D(fk) of the frequency fk.

Taking into consideration the above tendency, the frequency selector 54 of FIG. 4 selects one or more frequencies fk at which the determinant z1(fk) calculated by the index calculator 52 is large from the K frequencies f1 to fK. For example, the frequency selector 54 selects, from the K frequencies f1 to fK, a predetermined number of frequencies fk, which are located at higher positions when the K frequencies f1 to fK are arranged in descending order of the determinants z1(f1) to z1(fK) (i.e., in decreasing order of the determinants), or selects one or more frequencies fk whose determinant z1(fk) is greater than a predetermined threshold from the K frequencies f1 to fK.

Figure 7:
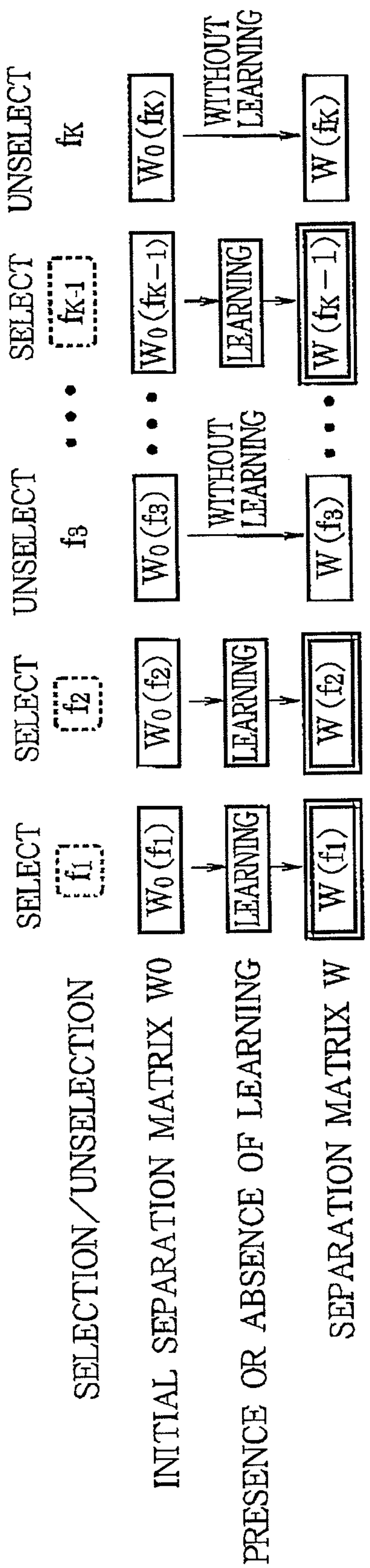
FIG. 7 is a conceptual diagram illustrating the operation of the separation matrix generator.

FIG. 7 is a conceptual diagram illustrating a relation between selection through the frequency selector 54 and learning through the learning processing unit 44. As shown in FIG. 7, for each frequency fk (f1, f2, fK−1 in FIG. 7) selected by the frequency selector 54, the learning processing unit 44 generates the separation matrix W(fk) by sequentially updating the initial separation matrix W0(fk) using the observed data D(fk) of the frequency fk. On the other hand, for each frequency fk (f3, fK in FIG. 7) unselected by the frequency selector 54, the initial separation matrix W0(fk) specified by the initial value generator 42 is set as the separation matrix W(fk) without learning in the signal processing unit 24.

In this embodiment, it is not necessary for the observed data D (fk) of the frequencies fk unselected by the frequency selector 54 to generate the separation matrices W(f1) to W(fK) (i.e., to perform learning through the learning processing unit 44) since learning of the separation matrix W(fk) is selectively performed only for frequencies fk at which the significance of learning using the observed data D(fk) is high. Accordingly, this embodiment has advantages in that the capacity of the storage unit 14 required to generate the separation matrices W(f1) to W(fK) is reduced and the load of processing through the learning processing unit 44 is also reduced.

Figures 8, 9:
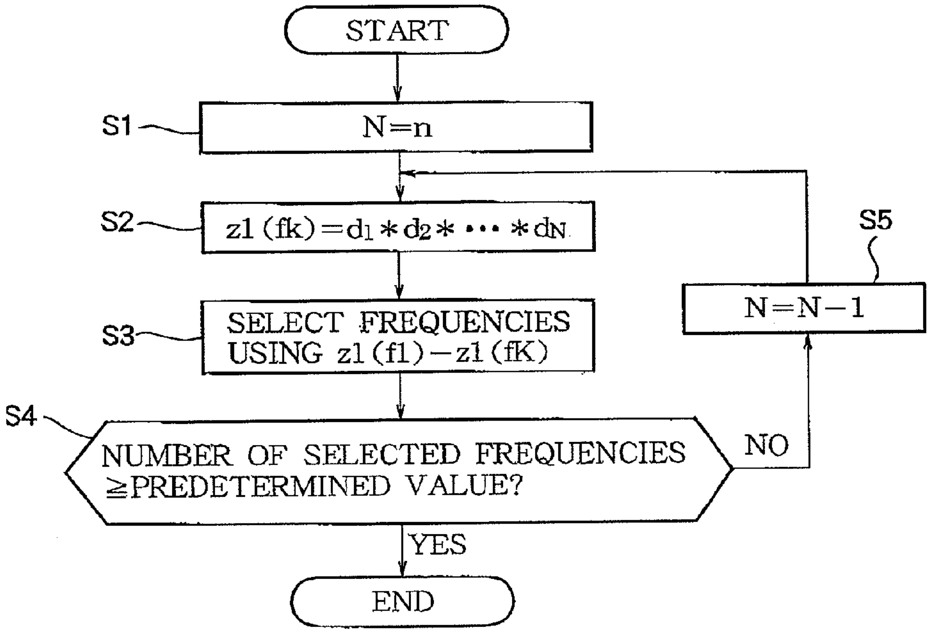
FIG. 8 is a diagram illustrating the advantages of the first embodiment.
FIG. 9 is a flow chart of the operations of an index calculator and a frequency selector in a second embodiment.

FIG. 8 illustrates a relation between the number of frequencies fk that are subjected to learning by the learning processing unit 44 (when the total number of K frequencies is 512), Noise Reduction Rate (NRR), and the required capacity of the storage unit 14. The capacity of the storage unit 14 is expressed, assuming that the capacity required for learning using the observed data D(fk) of all frequencies (f1-f512) is 100%. The NRR is the difference between the ratio SNR_OUT of the magnitude of the sound SV1 to the magnitude of the sound SV2 in the separated signal U1, which is an SN ratio when the sound SV1 is a target sound and the sound SV2 is noise, and the ratio SNR_IN of the magnitude of the sound SV1 to the magnitude of the sound SV2 in the observed signal V1 (i.e., NRR=SNR_OUT−SNR_IN). Accordingly, the accuracy of sound source separation increases as the NRR increases.

As is understood from FIG. 8, the ratio of change of the capacity of the storage unit 14 to change of the number of frequencies fk that are subjected to learning is sufficiently high, compared to the ratio of change of the NRR to change of the number of frequencies fk. For example, when the number of frequencies fk that are subjected to learning is changed from 512 to 50, the NRR is reduced by about 20% (14.37->11.5) while the capacity of the storage unit 14 is reduced by about 90%. That is, according to the first embodiment in which learning is performed only for frequencies fk that the frequency selector 54 selects from the K frequencies f1 to fK, it is possible to efficiently reduce the capacity required for the storage unit 14 (together with the amount of processing through the arithmetic processing unit 12) while maintaining the NRR above a desired level (i.e., preventing a serious reduction in NRR). These advantages are effective especially when the signal processing device 100 is mounted in a portable electronic device (for example, a mobile phone) in which the performance of the arithmetic processing unit 12 and the available capacity of the storage unit 14 are restricted.

<B: Second Embodiment>

The following is a description of a second embodiment of the invention. While two sound receiving devices M (sound receiving device M1 and M2) are used in the first embodiment, the second embodiment will be described with reference to the case where three or more sound receiving devices M are used to separate sounds from three or more sound sources (i.e., n≥3). In each of the following embodiments, elements with the same operations or functions as those of the first embodiment are denoted by the same reference numerals or symbols and a detailed description thereof is omitted as appropriate.

FIG. 9 is a flow chart of the operations of the index calculator 52 and the frequency selector 54. The procedure of FIG. 9 is performed for each unit interval TU. First, the index calculator 52 initializes a variable N to n which is the total number of sound receiving devices M (i.e., the total number of sound sources S that are subjected to sound source separation) (step S1), and then calculates determinants z1(f1) to z1(fK) (step S2). As described above with reference to Equation (5), the determinant z1(fk) is calculated as the product of N diagonal elements (n diagonal elements d1, d2, . . . , dn at the present step) of the singular value matrix D of the covariance matrix Rxx(fk).

The frequency selector 54 selects one or more frequencies fk at which the determinant z1(fk) that the index calculator 52 calculates at step S2 is great (step S3). For example, similar to the first embodiment, this embodiment preferably employs a configuration in which the frequency selector 54 selects, from the K frequencies f1 to fK, a predetermined number of frequencies fk, which are located at higher positions when the K frequencies f1 to fK are arranged in descending order of the determinants z1(f1) to z1(fK), or a configuration in which the frequency selector 54 selects one or more frequencies fk whose determinant z1(fk) is greater than a predetermined threshold from the K frequencies f1 to fK. The frequency selector 54 determines whether or not the number of selected frequencies fk has reached a predetermined value (step S4). The procedure of FIG. 9 is terminated when the number of selected frequencies fk is equal to or greater than the predetermined value (YES at step S4).

When the number of selected frequencies fk is less than the predetermined value (NO at step S4), the index calculator 52 subtracts 1 from the variable N (step S5) and calculates determinants z1(f1) to z1(fK) corresponding to the changed variable N (step S2). That is, the index calculator 52 calculates the determinant z1(fk) after removing one diagonal element from the n diagonal elements of the singular value matrix D of the covariance matrix Rxx(fk). The frequency selector 54 selects a frequency fk, which does not overlap the previously selected frequencies fk, using determinants z1(f1) to z1(fK) newly calculated at step S1 (step S3).

As described above, until the total number of frequencies fk selected at step S3 of each round reaches the predetermined value (YES at step S4), the index calculator 52 and frequency selector 54 repeat the calculation of the determinant z1(fk) (step S2) and the selection of the frequency fk (step S3) while sequentially decrementing (the variable N indicating) the number of diagonal elements used to calculate the determinant z1(fk) among then diagonal elements of the singular value matrix D of the covariance matrix Rxx(fk). The process for reducing the number of diagonal elements of the singular value matrix D (step S5) is equivalent to the process for removing one basis in the distribution of the observed vectors X(t, fk).

In this embodiment, the determinants z1(f1) to z1(fK) which are indicative of selection of frequencies fk is calculated while sequentially removing bases in the distribution of the observed vectors X(t, fk). Accordingly, it is possible to accurately select frequencies fk at which the significance of learning using the observed data D is high, when compared to the case where frequencies fk are selected using determinants z1(f1) to z1(fK) calculated as the product of n diagonal elements of the singular value matrix D.

<Specific Example of Index Value of Significance of Learning>

A numerical value (statistic) described as an example in the following third to sixth embodiments, instead of the determinant z1(fk) of the covariance matrix Rxx(fk) in the first and second embodiments, is used as an index value of the significance of learning using the observed data D(fk).

<C: Third Embodiment>

The number of conditions z2(fk) of the covariance matrix Rxx(fk) of the observed vectors X(t, fk) included in the observed data D(fk) is defined by the following Equation (6). An operator ||A|| in Equation (6) represents a norm of a matrix A (i.e., the distance of the matrix). The number of conditions z2(fk) is a numerical value which is small when an inverse matrix exists for the covariance matrix Rxx(fk) (i.e., when the covariance matrix Rxx(fk) is nonsingular) and which is large when no inverse matrix exists for the covariance matrix Rxx (fk).

$$z2(fk)=\|Rxx(fk)\|\cdot\|Rxx(fk)^{-1}\| \quad (6)$$

The covariance matrix Rxx(fk) is decomposed into eigenvalues as represented by the following Equation (7a). In Equation (7a), a matrix U is an eigenmatrix, whose elements are eigenvectors and a matrix Σ is a matrix in which eigenvalues are arranged in diagonal elements. An inverse matrix of the covariance matrix Rxx(fk) is represented by the following Equation (7b) obtained by rearranging Equation (7a).

$$Rxx(fk)=U\Sigma U^H \quad (7a)$$

$$Rxx(fk)^{-1}=U\Sigma^{-1}U^H \quad (7b)$$

In the case where the elements of the matrix Σ include zero, there is no inverse matrix of the covariance matrix Rxx(fk) (i.e., the number of conditions z2(fk) of Equation (6) has a large value) since the matrix $\Sigma^{-1}$ diverges to infinity. On the other hand, when the elements of the matrix E (i.e., the eigenvalues of the covariance matrix Rxx(fk)) include a value close to zero, this indicates that the total number of bases in the distribution of the observed Vectors X(t, fk) is small. Accordingly, we can determine that there is a tendency that the number of conditions z2(fk) of the covariance matrix Rxx(fk) increases as the total number of bases of the observed vectors X(t, fk) decreases (i.e., the number of conditions z2(fk) decreases as the total number of bases increases). That is, the number of conditions z2(fk) of the covariance matrix Rxx(fk) serves as an index of the total number of bases of the observed vectors X(t, fk), similar to the determinant z1(fk).

Taking into consideration the above tendencies, in the third embodiment, the number of conditions z2(fk) of the covariance matrix Rxx(fk) is used to select frequencies fk. Specifically, the index calculator 52 calculates the numbers of conditions z2(fk) (z2(f1) to z2(fK)) by performing the calculation of Equation (6) on respective covariance matrices Rxx(fk) of the K frequencies f1 to fK. The frequency selector 54 selects one or more frequencies fk at which the number of conditions z2(fk) calculated by the index calculator 52 is small. For example, the frequency selector 54 selects, from the K frequencies f1 to fK, a predetermined number of frequencies fk, which are located at higher positions when the K frequencies f1 to fK are arranged in ascending order of the numbers of conditions z2(f1) to z2(fK) (i.e., in increasing order thereof), or selects one or more frequencies fk whose number of conditions z2(fk) is less than a predetermined threshold from the K frequencies f1 to fK. The operations of the initial value generator 42 and the learning processing unit 44 are similar to those of the first embodiment.

<D: Fourth Embodiment>

It can be considered that the significance of learning of the separation matrix W(fk) using the observed data D(fk) of a frequency fk increases as the statistical correlation between a time series of the magnitude x1(t, fk) of the observed signal V1 and a time series of the magnitude x2(t, fk) of the observed signal V2 decreases, since the separation matrix W(fk) is learned such that the separated signal U1 and the separated signal U2 obtained through sound source separation of the observed data D(fk) are statistically independent of each other. Therefore, in the fourth embodiment, an index value (correlation or amount of mutual information) corresponding to the degree of independency between the observed signal V1 and the observed signal V2 is used to select frequencies fk.

A correlation z3(fk) between the component of the frequency fk of the observed signal V1 and the component of the frequency fk of the observed signal V2 is represented by the following Equation (8). In Equation (8), a symbol E denotes the sum (or average) over a plurality of frames in the unit interval TU. A symbol σ1 denotes a standard deviation of the magnitude x1(t, fk) in the unit interval TU and a symbol σ2 denotes a standard deviation of the magnitude x2(t, fk) in the unit interval TU.

$$z3(fk)=E[\{x1(t,fk)-E(x1(t,fk))\}\{x2(t,fk)-E(x2(t,fk))\}]/\sigma1\sigma2 \quad (8)$$

As is understood from Equation (8), the value of the correlation z3(fk) of a frequency fk decreases as the degree of independency between the observed signal V1 and the observed signal V2 of the frequency fk increases (i.e., as the correlation therebetween decreases). Taking into consideration these tendencies, in the fourth embodiment, the index calculator 52 calculates the correlations z3(fk) (z3(f1) to z3(fK)) by performing the calculation of Equation (8) for each of the K frequencies f1 to fK, and the frequency selector 54 selects one or more frequencies fk at which the correlation z3(fk) is low from the K frequencies f1 to fK. For example, the frequency selector 54 selects, from the K frequencies f1 to fK, a predetermined number of frequencies fk, which are located at higher positions when the K frequencies f1 to fK are arranged in ascending order of the correlations z3(f1) to z3(fK), or selects one or more frequencies fk whose correlation z3(fk) is less than a predetermined threshold from the K frequencies f1 to fK. The operations of the initial value generator 42 and the learning processing unit 44 are similar to those of the first embodiment.

This embodiment preferably employs a configuration in which frequencies fk are selected using the amount of mutual information z4(fk) defined by the following Equation (9) instead of the correlation z3(fk). The value of the amount of mutual information z4(fk) of a frequency fk decreases as the degree of independency between the observed signal V1 and the observed signal V2 increases (i.e., as the correlation therebetween decreases), similar to the correlation z3. Accordingly, the frequency selector 54 selects one or more frequencies fk at which the amount of mutual information z4(fk) is low from the K frequencies f1 to fK.

$$z4(fk)=(-\tfrac{1}{2})\log(1-z3(fk)^2) \quad (9)$$

<E: Fifth Embodiment>

A trace z5 (power) of the covariance matrix Rxx(fk) is defined as the total sum of diagonal elements of the covariance matrix Rxx(fk). Since the diagonal elements of the covariance matrix Rxx(fk) correspond to the variance $\sigma1^2$ of the magnitude x1(t, fk) of the observed signal V1 in the unit interval TU and the variance $\sigma2^2$ of the magnitude x2(t, fk) of the observed signal V2 in the unit interval TU, the trace z5(fk) of the covariance matrix Rxx(fk) is also defined as the sum of the variance $\sigma1^2$ of the magnitude x1(t, fk) and the variance $\sigma2^2$ of the magnitude x2(t, fk) (i.e., $z5(fk)=\sigma1^2+\sigma2^2$).

Figure 10:
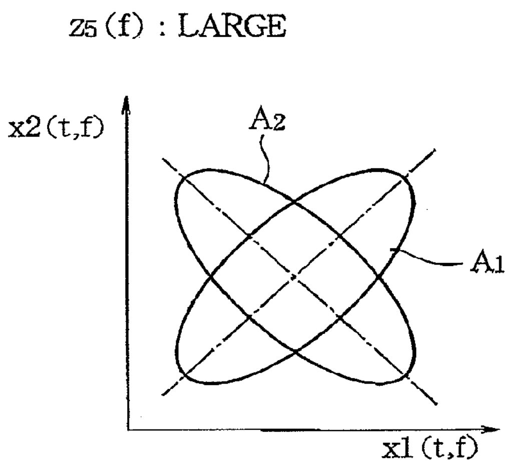
Figure 10:
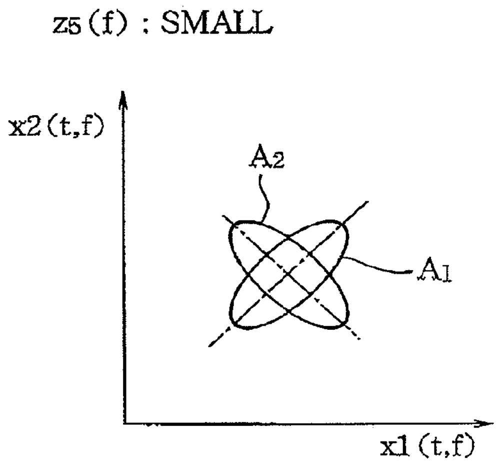

FIGS. 10(A) and 10(B) are scatter diagrams of observed vectors X(t, fk) in a unit interval TU. FIG. 10(A) is a scatter diagram when the trace z5(fk) is great and FIG. 10(B) is a scatter diagram when the trace z5(fk) is small. Similar to FIGS. 6(A) and 6(B), FIGS. 10(A) and 10(B) schematically show a region A1 in which observed vectors X(t, fk) where the sound SV1 from the sound source S1 is dominant are distributed and a region A2 in which observed vectors X(t, fk) where the sound SV2 from the sound source S2 is dominant are distributed.

The width of the distribution of the observed vectors X(t, fk) increases as the trace z5(fk) of the covariance matrix Rxx(fk) increases as is also understood from the fact that the trace z5(fk) is defined as the sum of the variance $\sigma 1^2$ of the magnitude x1(t, fk) and the variance $\sigma 2^2$ of the magnitude x2(t, fk). Accordingly, there is a tendency that, when the trace z5(fk) of the covariance matrix Rxx(fk) is large, regions (i.e., the regions A1 and A2) in which the observed vector X(t, fk) are distributed are clearly discriminated for each sound source S as shown in FIG. 10(A) and, when the trace z5(fk) is small, the regions A1 and A2 are poorly discriminated as shown in FIG. 10(B). That is, the trace z5(fk) serves as an index value of the pattern (width) of the region in which the observed vectors X(t, fk) are distributed.

Since learning (i.e., independent component analysis) of the separation matrix W(fk) through the learning processing unit 44 is equivalent to a process for specifying the same number of independent bases as the number of sound sources 5, it can be considered that the significance of learning of the separation matrix W(fk) using the observed data D(fk) at a frequency increases as the regions in which the observed vectors X(t, fk) are distributed are more clearly discriminated for each sound source S at the frequency fk (i.e., the trace z5(fk) of the frequency increases).

Taking into consideration these tendencies, in the fifth embodiment, the traces z5(f1) to z5(fK) of the covariance matrices Rxx(f1) to Rxx(fK) are used to select frequencies fk. Specifically, the index calculator 52 calculates traces z5(fk) (z5(f1) to z5(fK)) by summing the diagonal elements of the covariance matrix Rxx(fk) of each of the K frequencies f1 to fK. The frequency selector 54 selects one or more frequencies fk at which the trace z5(fk) calculated by the index calculator 52 is large. For example, the frequency selector 54 selects, from the K frequencies f1 to fK, a predetermined number of frequencies fk, which are located at higher positions when the K frequencies f1 to fK are arranged in descending order of the traces z5(f1) to z5(fK), or selects one or more frequencies fk whose trace z5(fk) is greater than a predetermined threshold from the K frequencies f1 to fK. The operations of the initial value generator 42 and the learning processing unit 44 are similar to those of the first embodiment.

<F: Sixth Embodiment>

The kurtosis z6(fk) of a frequence distribution of the magnitude x1(t, fk) of the observed signal V1 is defined by the following Equation (10), where the frequence distribution is a distribution function whose random variable is the magnitude x1(t, fk).

$$z6(fk)=\mu 4(fk)/\{\mu 2(fk)\}^2 \quad (10)$$

In Equation (10), the symbol μ4(fk) denotes a 4th-order central moment defined by Equation (11a) and the symbol μ2(fk) denotes a 2nd-order central moment defined by Equation (11b). In Equations (11a) and (11b), a symbol m(fk) denotes the average of the magnitudes x1(t, fk) of a plurality of frames in a unit interval TU.

$$\mu 4(fk)=E\{x1(t,fk)-m(fk)\}^4 \quad (11a)$$

$$\mu 2(fk)=E\{x1(t,fk)-m(fk)\}^2 \quad (11b)$$

The kurtosis z6(fk) has a large value when only one of the sound SV1 of the sound source S1 and the sound SV2 of the sound source S2 is included (or dominant) in the elements of the frequency (fk) of the observed signal V1, and has a small value when both the sound SV1 of the sound source S1 and the sound SV2 of the sound source S2 are included with approximately equal magnitude in the elements of the frequency (fk) of the observed signal V1 (central limit theorem). Since learning (i.e., independent component analysis) of the separation matrix W(fk) through the learning processing unit 44 is equivalent to a process for specifying the same number of independent bases as the number of sound sources S, it can be considered that the significance of learning of the separation matrix W(fk) of a frequency fk using the observed data D(fk) increases as the number of sound sources S of the sound SV at the frequency fk, which are included with meaningful volume in the observed signal V1, increases (i.e., as the kurtosis z6 of the frequency fk decreases).

Taking into consideration these tendencies, in the sixth embodiment, the kurtoses z6(fk) (z6(f1) to z6(fK)) of the frequence distribution of the magnitude x(t, fk) of the observed signal V1 are used to select frequencies fk. Specifically, the index calculator 52 calculates kurtoses z6(fk) (z6 (f1) to z6(fK)) by performing the calculation of Equation (10) for each of the K frequencies f1 to fK. The frequency selector 54 selects one or more frequencies fk at which the kurtosis z6(fk) is small from the K frequencies f1 to fK. For example, the frequency selector 54 selects, from the K frequencies f1 to fK, a predetermined number of frequencies fk, which are located at higher positions when the K frequencies f1 to fK are arranged in ascending order of the kurtoses z6(f1) to z6(fK), or selects one or more frequencies fk whose kurtosis z6(fk) is less than a predetermined threshold from the K frequencies f1 to fK. The operations of the initial value generator 42 and the learning processing unit 44 are similar to those of the first embodiment.

The value of kurtosis of human vocal sound is within a range from about 40 to 70. When the fact that kurtosis is low in environments with noise (central limit theorem), measurement errors of kurtosis, and the like are taken into consideration, the kurtosis of human vocal sound is included in a range from about 20 to 80, which will hereinafter be referred to as a "vocal range". A, frequency fk at which only normal noise such as air conditioner operating noise or crowd noise is present is highly likely to be selected by the frequency selector 54 since the kurtosis of the observed signal V1 has a sufficiently low value (for example, a value less than 20). However, it can be considered that the significance of learning of the separation matrix W using the observed data D(fk) of the frequency fk of normal noise is low if the target sounds of sound source separation (SV1 and SV2) are human vocal sounds.

Figure 11:
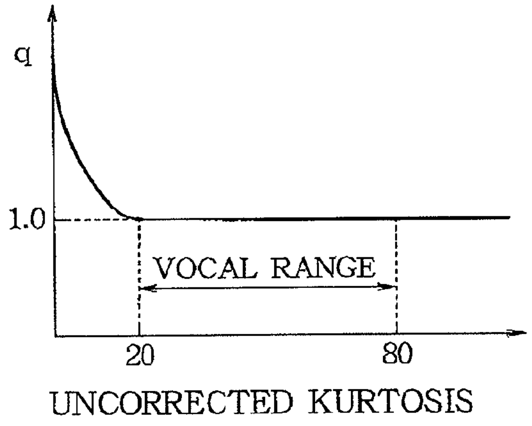
FIG. 11 is a graph illustrating a relation between uncorrected kurtosis and weight.

Thus, this embodiment preferably employs a configuration in which the kurtosis of Equation (10) is corrected so that frequencies fk of normal noise are excluded from frequencies to be selected by the frequency selector 54. For example, the index calculator 52 calculates, as the corrected kurtosis z6(fk), the product of the value defined by Equation (10), which will hereinafter be referred to as "uncorrected kurtosis", and a weight q. For example, the weight q is selected nonlinearly with respect to the uncorrected kurtosis as illustrated in FIG. 11. That is, when the uncorrected kurtosis is within a range less than the lower limit (for example, 20) of the vocal range, the weight q is selected variably according to the uncorrected kurtosis so that the kurtosis z6(fk) corrected through multiplication by the weight q exceeds the upper limit (for example, 80) of the vocal range. On the other hand, when the uncorrected kurtosis is within the vocal range, the weight q is set to a predetermined value (for example, 1). In addition, when the uncorrected kurtosis is greater than the upper limit of the vocal range, the weight q is set to the same predetermined value as when the uncorrected kurtosis is within the vocal range since the uncorrected kurtosis is sufficiently high (i.e., since the frequency fk is less likely to be selected). According to the above configurations, it is possible to generate a separation matrix W(fk) which can accurately separate a desired sound.

<G: Seventh Embodiment>

In each of the above embodiments, for each frequency not selected by the frequency selector 54, which will also be referred to as an "unselected frequency", the initial separation matrix W0(fk) specified by the initial value generator 42 is applied as the separation matrix W(fk) to the signal processing unit 24. In the seventh embodiment described below, the separation matrix W(fk) of the unselected frequency fk is generated (or supplemented) using the separation matrix W(fk) learned by the learning processing unit 44.

Figure 12:
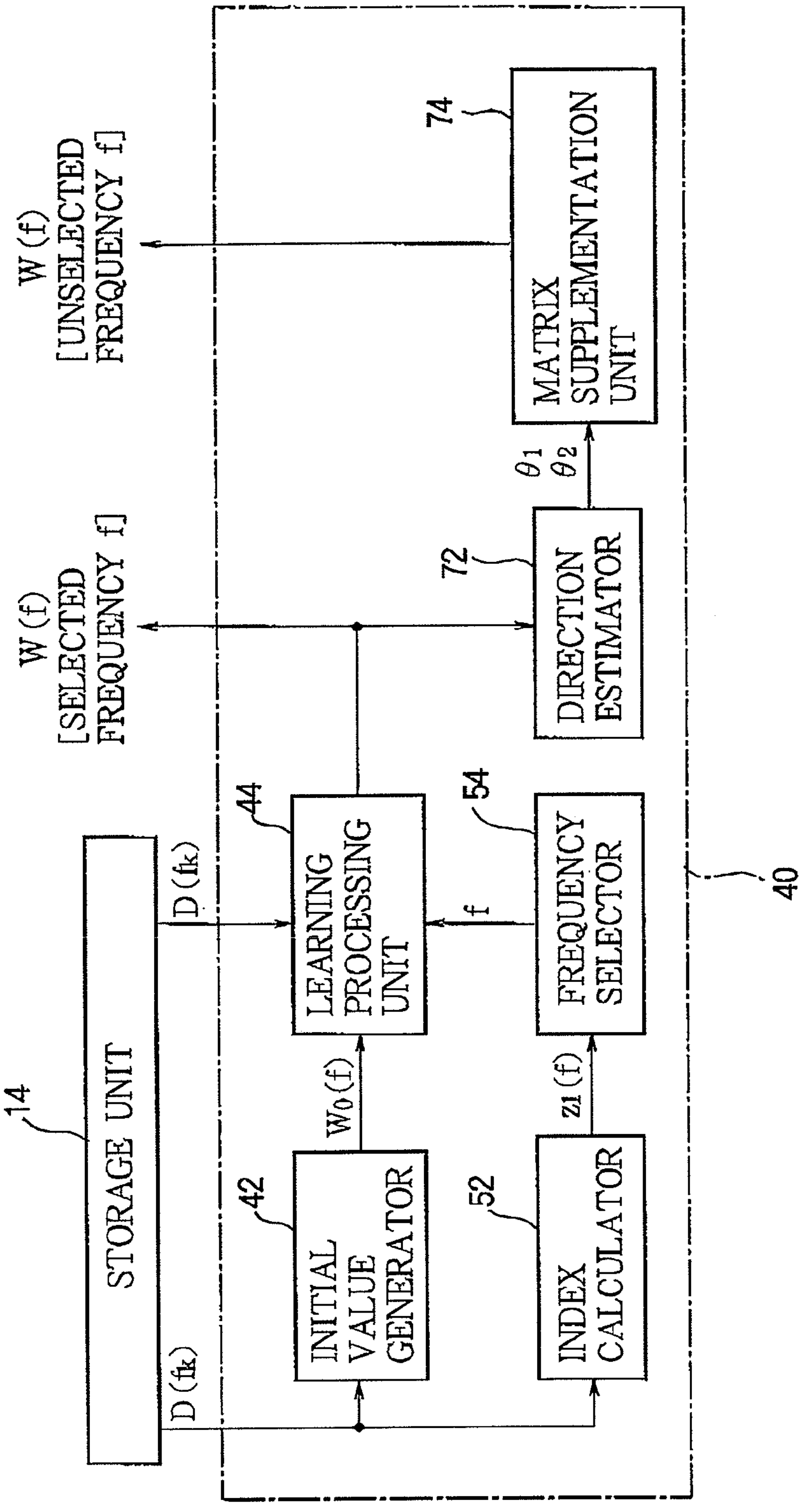
FIG. 12 is a block diagram of a separation matrix generator in a seventh embodiment.
Figure 13:
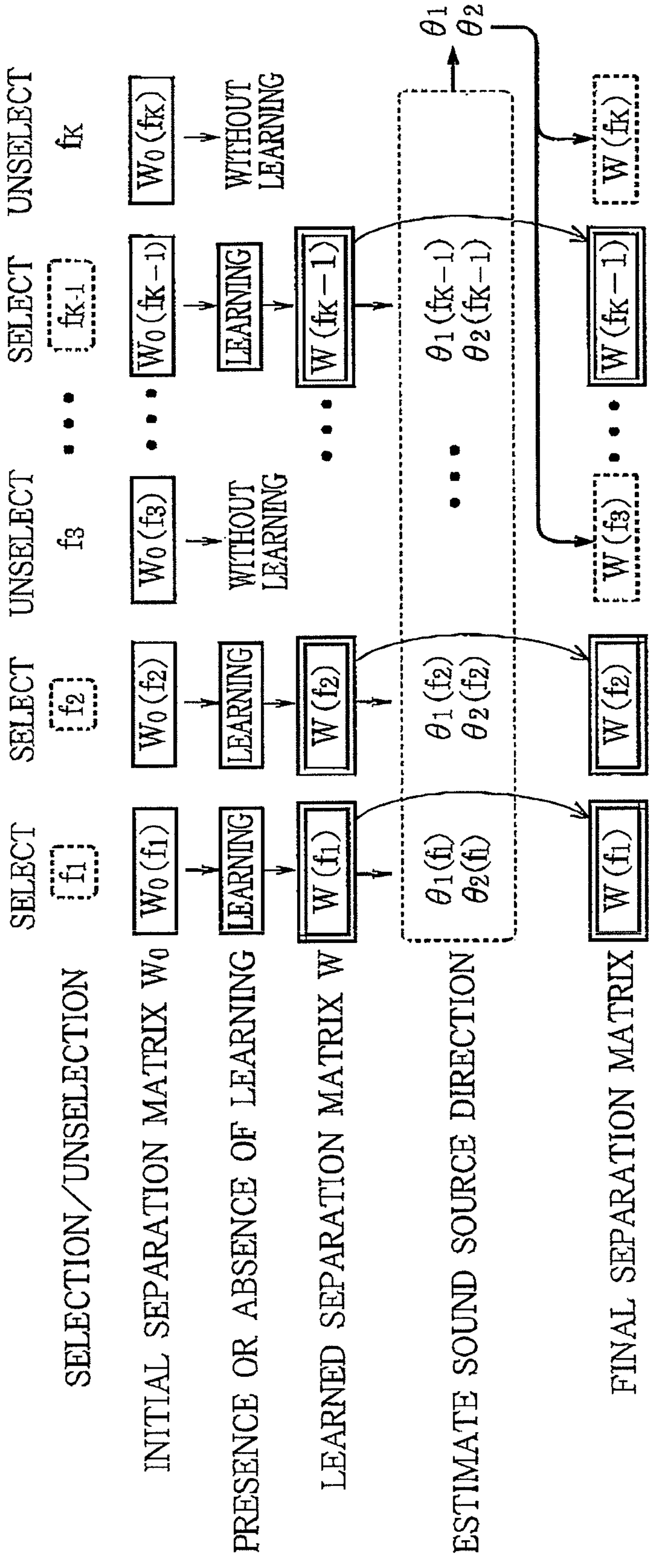
FIG. 13 is a conceptual diagram illustrating the operation of the separation matrix generator.

FIG. 12 is a block diagram of a separation matrix generator 40 in a signal processing device 100 of the seventh embodiment, and FIG. 13 is a conceptual diagram illustrating a procedure performed by the separation matrix generator 40. As shown in FIG. 12, the separation matrix generator 40 of the seventh embodiment includes a direction estimator 72 and a matrix supplementation unit 74 in addition to the components of the separation matrix generator 40 of the first embodiment.

The separation matrix W(fk) that the learning processing unit 44 learns for each frequency fk selected by the frequency selector 54 is provided to the direction estimator 72. The direction estimator 72 estimates a direction θ1 of the sound source S1 and a direction θ2 of the sound source S2 from each learned separation matrix W(fk). For example, the following methods are preferably used to estimate the direction θ1 and the direction θ2.

First, as shown in FIG. 13, the direction estimator 72 estimates the direction θ1(fk) of the sound source S1 and the direction θ2(fk) of the sound source S2 for each frequency fk selected by the frequency selector 54. More specifically, the direction estimator 72 specifies the direction θ1(fk) of the sound source S1 from a coefficient w11(fk) and a coefficient w21(fk) included in the separation matrix W(fk) learned by the learning processing unit 44 and specifies the direction θ2(fk) of the sound source S2 from the coefficient w12(fk) and the coefficient w22(fk). For example, the direction of a beam formed by a filter 32 of a processing unit pk when the coefficient w11(fk) and the coefficient w21(fk) are set is estimated as the direction θ1(fk) of the sound source S1 and the direction of a beam formed by a filter 34 of a processing unit pk when the coefficient w12(fk) and the coefficient w22 (fk) are set is estimated as the direction θ2(fk) of the sound source S2. A method described in H. Saruwatari, et. al., "Blind Source Separation Combining Independent Component Analysis and Beam-Forming," EURASIP Journal on Applied Signal Processing Vol. 2003, No. 11, pp. 1135-1146, 2003 is preferably used to specify the direction θ1(fk) and direction θ2(fk) using the separation matrix W(fk).

Second, as shown in FIG. 13, the direction estimator 72 estimates the direction θ1 of the sound source S1 and the direction θ2 of the sound source 32 from the direction θ1(fk) and the direction θ2(fk) of each frequency fk selected by the frequency selector 54. For example, the average or central value of the direction θ1(fk) estimated for each frequency fk is specified as the direction θ1 of the sound source S1 and the average or central value of the direction θ2(fk) estimated for each frequency fk is specified as the direction θ2 of the sound source 32.

The matrix supplementation unit 74 of FIG. 12 specifies the separation matrix W(fk) of each unselected frequency fk from the directions θ1 and θ2 estimated by the direction estimator 72 as shown in FIG. 13. Specifically, for each unselected frequency fk, the matrix supplementation unit 74 generates a separation matrix W(fk) of 2 rows and 2 columns whose elements are the coefficients w11(fk) and w21(fk) calculated such that the filter 32 of the processing unit pk forms a beam in the direction θ1 and the coefficients w12(fk) and w22(fk) calculated such that the filter 34 of the processing unit pk forms a beam in the direction θ2. As shown in FIGS. 12 and 13, the separation matrix W(fk) learned by the learning processing unit 44 is used for the signal processing unit 24 for each frequency fk selected by the frequency selector 54 and the separation matrix W(fk) generated by the matrix supplementation unit 74 is used for the signal processing unit 24 for each unselected frequency fk.

Since the separation matrix W(fk) learned for each frequency fk selected by the frequency selector 54 is used (i.e., the initial separation matrix W0(fk) of the unselected frequency fk is not used) to generate the separation matrix W(fk) of each unselected frequency fk, the seventh embodiment has an advantage in that accurate sound source separation is achieved not only for the frequency (fk) selected by the frequency selector 54 but also for the unselected frequency fk, regardless of the performance of sound source separation of the initial separation matrix W0(fk) of the unselected frequency fk.

While, in the above example, the direction θ1 and the direction θ2 are estimated from directions θ1(fk) and θ2(fk) corresponding to each of a plurality of frequencies fk selected by the frequency selector 54, this embodiment also preferably employs a configuration in which a direction θ1(fk) and a direction θ2(fk) corresponding to a specific frequency fk among the plurality of frequencies fk selected by the frequency selector 54 are used as a direction θ1 and a direction θ2 to be used for the matrix supplementation unit 74 to generate the separation matrix W(fk).

[H: Eighth Embodiment]

In the seventh embodiment, the direction estimator 72 estimates the direction θ1(fk) and the direction θ2(fk) using the separation matrices W(fk) of all frequencies fk selected by the frequency selector 54. However, in some case, the direction θ1(fk) or the direction θ2(fk) cannot be accurately estimated from separation matrices W(fk) of frequencies fk at a lower band side or frequencies fk at a higher band side in the range of frequencies. Therefore, in the eighth embodiment of the invention, separation matrices W(fk) learned for frequencies fk excluding the frequencies fk at the lower side and the frequencies fk at the higher side among the plurality of frequencies fk selected by the frequency selector 54 are used to estimate the direction θ1(fk) and the direction θ2(fk) (thus to estimate the direction θ1 and the direction θ2).

For example, it is assumed that a range of frequencies from 0 Hz to 4000 Hz is divided into 512 frequencies (i.e., bands) f1 to f512 (K=512). The direction estimator 72 estimates a direction θ1(fk) and a direction θ2(fk) from separation matrices W(fk) that the learning processing unit 44 has learned for frequencies fk that the frequency selector 54 has selected from frequencies f200 to f399 excluding the lower-band-side frequencies f1 to f199 and the higher-band-side frequencies f400 to f512. Even when the frequency selector 54 has selected the lower-band-side frequencies f1 to f199 and the higher-band-side frequencies f400 to f512 (and, in addition, even when separation matrices Wfk have been generated for the lower and higher-band-side frequencies through learning by the learning processing unit 44), they are not used to estimate the direction e1(fk) and the direction 82(fk). A configuration, in which separation matrices W(fk) of unselected frequencies fk are generated from the direction θ1(fk) and the direction 82(fk) estimated by the direction estimator 72, is identical to that of the seventh embodiment.

In the eighth embodiment, the direction 81 and the direction θ2 are accurately estimated, compared to when separation matrices W(fk) of all frequencies fk selected by the frequency selector 54 are used, since separation matrices w(fk) learned for frequencies fk excluding lower-band-side frequencies fk and higher-band-side, frequencies fk are used to estimate the direction θ1 and the direction θ2. Accordingly, it is possible to generate separation matrices W(fk) which enable accurate sound source separation for unselected frequencies fk. Although both the lower-band-side frequencies fk and the higher-band-side frequencies fk are excluded in the above example, this embodiment may also employ a configuration in which either the lower-band-side frequencies fk and the higher-band-side frequencies fk are excluded to estimate the direction θ1(fk) and the direction θ2(fk).

<I: Ninth Embodiment>

In each of the above embodiments, a predetermined number of frequencies are selected using index values z(f1) to z(fK) (for example, the determinant z1(fk), the number of conditions z2(fk), the correlation z3(fk), the amount of mutual information z4(fk), the trace z5(fk), and the kurtosis z6(fk)) calculated for a single unit interval TU. In the ninth embodiment described below, index values z(f1) to z(fK) of a plurality of unit intervals TU are used to select frequencies fk in one unit interval TU.

Figures 14, 15:
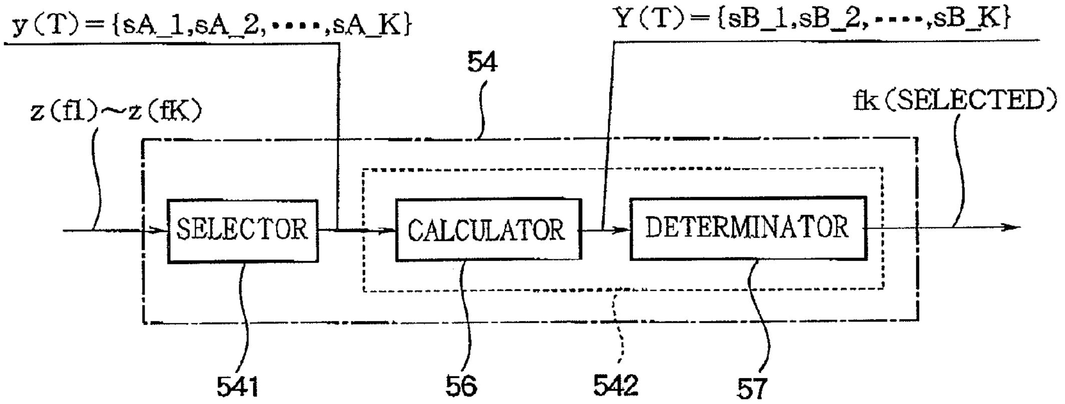
FIG. 14 is a block diagram of a frequency selector in a ninth embodiment.
FIG. 15 is a diagram illustrating the advantages of the ninth embodiment.

FIG. 14 is a block diagram of a frequency selector 54 in a separation matrix generator 40 of the ninth embodiment. As shown in FIG. 14, the frequency selector 54 includes a selector 541 and a selector 542. Index values z(f1) to z(fK) that the index calculator 52 calculates from observed data D(f1) to D(fK) are provided to the selector 541 for each unit interval TU. The index value z(fk) is a numerical value (for example, any of the determinant z1(fk), the number of conditions z2(fk), the correlation z3(fk), the amount of mutual information z4(fk), the trace z5(fk), and the kurtosis z6(fk)) that is used as a measure of the significance of learning of separation matrices W(fk), using observed data D(fk).

Similar to the frequency selector 54 of each of the above embodiments, for each unit interval TU, the selector 541 sequentially determines whether or not to select each of the K frequencies f1 to fK according to the index values z(f1) to z(fK) of each unit interval TU. Specifically, for each unit interval TU, the selector 541 sequentially generates a series y(T) of K numerical values sA_1 to sA_K representing whether or not to select each of the K frequencies f1 to fK. In the following, the series of numerical values will be referred to as a "numerical value sequence". The numerical value sA_k of the numerical value sequence y(T) is set to different values when it is determined according to the index value z(fk) that the frequency fk is selected and when it is determined that the frequency fk is not selected. For example, the numerical value sA_k is set to "1" when the frequency fk is selected and is set to "0" when the frequency fk is not selected.

The selector 542 selects a plurality of frequencies fk from the results of determination that the selector 541 has made for a plurality of unit intervals TU (J+1 unit intervals TU). Specifically, the selector 542 includes a calculator 56 and a determinator 57. The calculator 56 calculates a coefficient sequence Y(T) according to coefficient sequences y(T) to y(T−J) of J+1 unit intervals TU that are a unit interval TU of number T and J previous unit intervals TU. The coefficient sequence Y(T) corresponds to, for example, a weighted sum of coefficient sequences y(T) to y(T−J) as defined by the following Equation (12).

$$Y(T) = \sum_{j=0}^{J} \alpha_j y(T-j) \tag{12}$$

The coefficient αj (j=0−J) in Equation (12) indicates a weight for the coefficient sequence y(T−j). For example, a weight αj of a unit interval TU that is later (i.e., newer) is set to a greater numerical value (i.e., α0>α1> . . . >αJ). The coefficient sequence Y(T) is a series of K numerical values sB_1 to sB_K. The numerical values sB_k are weights of the respective numerical values sA_k of coefficient sequences y(T) to y(T−J). Accordingly, the numerical value sB_k of the coefficient sequence Y(T) corresponds to an index of the number of times the selector 541 has selected the frequency fk in J+1 unit intervals TU. That is, the numerical value sB_k of the coefficient sequence Y(T) increases as the number of times the selector 541 has selected the frequency fk in J+1 unit intervals TU increases.

The determinator 57 selects a predetermined number of frequencies fk using the coefficient sequence Y(T) calculated by the calculator 56. Specifically, the determinator 57 selects a predetermined number of frequencies fk corresponding to numerical values sB_k, which are located at higher positions among the K numerical values sB_1 to sB_K of the coefficient sequence Y(T) when they are arranged in descending order. That is, the determinator 57 selects frequencies fk that the selector 541 has selected a large number of times in J+1 unit intervals TU. The selection of frequencies fk by the determinator 57 is performed sequentially for each unit interval TU.

The learning processing unit 44 generates separation matrices W(fk) by performing learning upon the initial separation matrix W0(fk) using the observed data D(fk) of each frequency fk that the determinator 57 has selected from the K frequencies f1 to fK. A configuration in which the initial separation matrix W0(fk) is used as the separation matrix W(fk) (the first embodiment) or a configuration in which a separation matrix W(fk) that the matrix supplementation unit 74 generates from the learned separation matrix W(fk) is used (the seventh embodiment or the eighth embodiment) may be employed for unselected frequencies (i.e., for frequencies not selected by the determinator 57).

In the configuration in which the index values z(fk) of only one unit interval TU are used to select frequencies fk (for example, in the first embodiment), there is a possibility that the determination as to whether or not to select frequencies fk frequently changes for each unit interval TU and accurate learning of the separation matrix W(fk) is not achieved since the index value z(fk) depends on the observed data D(fk). In an environment with great noise (i.e., an environment in which the observed data D(fk) greatly changes), the reduction in the accuracy of learning of the separation matrix W(fk) is especially problematic since the frequency of change of the determination of selection/unselection of frequencies fk is increased in the environment. In the ninth embodiment, the results of determination of selection/unselection of frequencies fk is stable (or reliable) (i.e., the frequency of change of the determination results is low) even when the observed data D(fk) has suddenly changed, for example, due to noise since whether or not to select frequencies fk of each unit interval TU is determined taking into consideration the overall results of determination of selection/unselection of frequencies fk of a plurality of unit intervals TU (J+1 unit intervals TU). Accordingly, the ninth embodiment has an advantage in that it is possible to generate a separation matrix W(fk) which can accurately separate a desired sound.

FIG. 15 is a diagram illustrating measurement results of the Noise Reduction Rate (NRR). In FIG. 15, NRRs of a configuration (for example, the first embodiment) in which frequencies fk that are targets of learning are selected from index values z(fk) of only one unit interval TU are illustrated as an example for comparison with the ninth embodiment. NRRs were measured for angles θ2 (−90°, −45°, 45°, and 90°) of the sound source S2 obtained by sequentially changing the direction θ2 in intervals of 45°, starting from −90°, with the direction θ1 of the sound source S1 fixed to 0°. It can be understood from FIG. 15 that the configuration (the ninth embodiment), in which whether or not to select frequencies fk of each unit interval TU is determined taking into consideration the determination of selection/unselection of frequencies fk in a plurality of unit intervals TU (50 unit intervals TU in FIG. 15), increases the NRR (i.e., increases the accuracy of sound source separation).

Although a weighted sum (coefficient sequence Y(T)) of the coefficient sequences y(T) to y(T−J) is applied to select frequencies fk in the above example, the method for selecting frequencies fk which are learning targets may be changed as appropriate. For example, this embodiment may also employ a configuration in which, for each of the K frequencies f1 to fK, the number of times the frequency is selected in J+1 unit intervals TU is counted and a predetermined number of frequencies fk which are selected a large number of times are selected as learning targets (i.e., a configuration in which a weighted sum of coefficient sequences y(T) to y(T−J) is not calculated).

For example, this embodiment may also preferably employ a configuration in which the coefficient sequence Y(T) is calculated by simple summation of the coefficient sequences y(T) to y(T−J). However, according to the configuration in which the weighted sum of the coefficient sequences y(T) to y(T−J) is calculated, it is possible to determine whether or not to select frequencies fk, preferentially taking into consideration the results of determination of selection/unselection of frequencies fk in a specific unit interval TU among the J+1 unit intervals TU. In the configuration in which the weighted sum of the coefficient sequences y(T) to y(T−J) is calculated, the method for selecting weights α0 to αJ is arbitrary. For example, it is preferable to employ a configuration in which the weight αj is set to a smaller value as the SN ratio of the (T−j)th unit interval TU decreases.

<J: Modifications>

Various modifications can be made to each of the above embodiments. The following are specific examples of such modifications. It is also possible to arbitrarily select and combine two or more of the following modifications.

(1) Modification 1

Although a Delay-Sum (DS) type beam-former which emphasizes a sound arriving from a specific direction is applied to each processing unit Pk (the filter 32 and the filter 34) in each of the above embodiments, a blind control type (null) beam-former which suppresses a sound arriving from a specific direction (i.e., which forms a blind zone for sound reception) may also be applied to each processing unit pk. For example, the blind control type beam-former is implemented by changing the adder 325 of the filter 32 and the adder 345 of the filter 34 of the processing unit pk to subtractors. When the blind control type beam-former is employed, the separation matrix generator 40 determines the coefficients (w11(fk) and w21(fk)) of the filter 32 so that a blind zone is formed in the direction θ1 and determines the coefficients (w12(fk) and w22(fk)) of the filter 34 so that a blind zone is formed in the direction 82. Accordingly, the sound SV1 of the sound source S1 is suppressed (i.e., the sound SV2 is emphasized) in the separated signal U1 and the sound SV2 of the sound source S2 is suppressed (i.e., the sound SV1 is emphasized) in the separated signal U2.

(2) Modification 2

In each of the above embodiments, the frequency analyzer 22, the signal processing unit 24, and the signal synthesizer 26 may be omitted from the signal processing device 100. For example, the invention may also be realized using a signal processing device 100 that includes a storage unit 14 that stores observed data D(fk) and a separation matrix generator 40 that generates separation matrices W(fk) from the observed data D(fk). A separated signal U1 and a separated signal U2 are generated by providing the separation matrices W(fk) (W(f1) to W(fK)) generated by the separation matrix generator 40 to a signal processing unit 24 in a device separated from the signal processing device 100.

(3) Modification 3

Although the initial value generator 42 generates an initial separation matrix W0(fk) (W0(f1) to W0(fK)) for each of the K frequencies f1 to fK in each of the above embodiments, the invention may also employ a configuration in which a predetermined initial separation matrix W0 is commonly applied as an initial value for learning of the separation matrices W(f1) to W(fK) by the learning processing unit 44. The configuration in which the initial separation matrix W0(fk) is generated from observed data D(fk) is not essential in the invention. For example, the invention may also employ a configuration in which initial separation matrices W0(f1) to W0(fK) which are previously generated and stored in the storage unit 14 are used as initial values for learning of the separation matrices W(f1) to W(fK) by the learning processing unit 44. In the configuration in which initial separation, matrices W0(fk) of unselected frequencies fk are not used (for example, the seventh and eighth embodiments), the initial value generator 42 may generate an initial separation matrix W0(fk) only for each frequency fk that the frequency selector 54 has selected from the K frequencies f1 to fK.

(4) Modification 4

The index values (i.e., the determinant z1(fk), the number of conditions z2(fk), the correlation z3(fk), the amount of mutual information z4(fk), the trace z5(fk), and the kurtosis z6(fk))) which are each used as a reference for selection of frequencies fk in each of the above embodiments are merely examples of a measure (or indicator) of the significance of learning of the separation matrices W(fk) using the observed data D(fk) of the frequencies fk. Of course, a configuration in which index values different from the above examples are used as a reference for selection of frequencies fk is also included in the scope of the invention. A combination of two or more index values arbitrarily selected from the above examples may also be preferably used as a reference for selection of frequencies fk. For example, the invention may employ a configuration in which frequencies fk at which a weighted sum of the determinant z1 and the trace z5 is great are selected or a configuration in which frequencies fk at which a weighted sum of the reciprocal of the determinant z1 and the kurtosis z6 is small are selected. In both of these configurations, frequencies fk with high learning effect are selected.

The methods for calculating the index values are also not limited to the above examples. For example, to calculate the determinant z1(fk) of the covariance matrix Rxx(fk), the invention may employ not only the method of the first embodiment in which singular value decomposition of the covariance matrix Rxx(fk) is used but also a method in which the variance $\sigma1^2$ of the magnitude x1(r, fk) of the observed signal V1, the variance $\sigma2^2$ of the magnitude x2(r, fk) of the observed signal V2, and the correlation z3(fk) of Equation (8) are substituted into the following Equation (13).

$$z1(fk)=\sigma1^2\sigma2^2(1-z3(fk)^2) \tag{13}$$

(5) Modification 5

Although each of the above embodiments, excluding the second embodiment, is exemplified by the case where the number of sound sources S (S1, S2) is 2 (i.e., n=2), of course, the invention is also applicable to the case of separation of a sound from three or more sound sources S. n or more sound receiving devices M are required when the number of sound sources S, which are targets of sound source separation, is n.

What is claimed is:

1. A signal processing device for processing a plurality of observed signals at a plurality of frequencies, the plurality of the observed signals being produced by a plurality of sound receiving devices which receive a mixture of a plurality of sounds, the signal processing device comprising:

a storage unit that stores observed data of the plurality of the observed signals, the observed data representing a time series of magnitude of each frequency in each of the plurality of the observed signals;

an index calculation unit that calculates an index value from the observed data for each of the plurality of the frequencies, the index value indicating significance of learning of a separation matrix using the observed data of each frequency of the plurality of the frequencies and representing a total number of bases that are axis lines of regions in which observed vectors obtained from the observed data are distributed, each observed vector including, as elements, respective magnitudes of a corresponding frequency in the plurality of the observed signals, the separation matrix being used for separation of the plurality of the sounds;

a frequency selection unit that selects at least one frequency from the plurality of the frequencies according to the index value of each frequency calculated by the index calculation unit by selecting one or more frequencies at which the total number of the bases represented by the index value is larger than a total number of bases represented by index values at other frequencies; and a learning processing unit that determines the separation matrix by learning with a given initial separation matrix using the observed data of the frequency selected by the frequency selection unit among the plurality of the observed data stored in the storage unit.

2. The signal processing device according to claim 1, wherein the index calculation unit calculates, as the index value, a determinant of a covariance matrix of the observed vectors for each of the plurality of the frequencies, and the frequency selection unit selects one or more frequency at which the determinant is greater than determinants at other frequencies.

3. The signal processing device according to claim 2, wherein the index calculation unit calculates a first determinant corresponding to product of a first number of diagonal elements among a plurality of diagonal elements of a singular value matrix specified through singular value decomposition of the covariance matrix of the observed vectors, and calculates a second determinant corresponding to product of a second number of the diagonal elements, which are fewer in number than the first number of the diagonal elements, among the plurality of the diagonal elements, and the frequency selection unit sequentially performs selecting of frequency using the first determinant and selecting of frequency using the second determinant.

4. The signal processing device according to claim 1, wherein the index calculation unit calculates, as the index value, a number of conditions of a covariance matrix of the observed vectors, and the frequency selection unit selects one or more frequency at which the number of the conditions is smaller than number of conditions calculated at other frequencies.

5. The signal processing device according to claim 1, wherein the index calculation unit calculates an index value representing independency between the plurality of the observed signals at each frequency, and the frequency selection unit selects one or more frequency at which the independency represented by the index value is higher than independencies calculated at other frequencies.

6. The signal processing device according to claim 5, wherein the index calculation unit calculates, as the index value, a correlation between the plurality of the observed signals or an amount of mutual information of the plurality of the observed signals, and the frequency selection unit selects one or more frequency at which the correlation or the amount of mutual information is smaller than correlations or amounts of mutual information calculated at other frequencies.

7. The signal processing device according to claim 1, wherein the index calculation unit calculates, as the index value, a trace of a covariance matrix of the plurality of the observed signals at each of the plurality of the frequencies, and the frequency selection unit selects a frequency at which the trace is greater than traces at other frequencies.

8. The signal processing device according to claim 1, wherein the index calculation unit calculates, as the index value, kurtosis of a frequency distribution of magnitude of the observed signals at each of the plurality of the frequencies, and the frequency selection unit selects one or more frequency at which the kurtosis is lower than kurtoses at other frequencies.

9. The signal processing device according to claim 1, further comprising an initial value generation unit that generates an initial separation matrix for each of the plurality of the frequencies, wherein the learning processing unit generates the separation matrix of the frequency selected by the frequency selection unit through learning using the initial separation matrix of the selected frequency as an initial value, and uses the initial separation matrix of a frequency not selected by the frequency selection unit as a separation matrix of the frequency that is not selected.

10. The signal processing device according to claim 1, further comprising:

a direction estimation unit that estimates a direction of a sound source of each of the plurality of the sounds from the separation matrix generated by the learning processing unit; and a matrix supplementation unit that generates a separation matrix of a frequency not selected by the frequency selection unit from the direction estimated by the direction estimation unit.

11. The signal processing device according to claim 10, wherein the direction estimation unit estimates the direction of the sound source of each of the plurality of the sounds from the separation matrix that is generated by the learning processing unit for at least a frequency excluding at least one of a frequency at lower-band-side and a frequency at higher-band-side among the plurality of the frequencies.

12. The signal processing device according to claim 1, wherein the index calculation unit sequentially calculates, for each unit interval of the sound signals, an index value of each of the plurality of the frequencies, and wherein the frequency selection unit comprises:

a first selection unit that sequentially determines, for each unit interval, whether or not to select each of the plurality of the frequencies according to an index value of the unit interval; and a second selection unit that selects the at least one frequency from results of the determination of the first selection unit for a plurality of unit intervals.

13. The signal processing device according to claim 1, wherein the first selection unit sequentially generates, for each unit interval, a numerical value sequence indicating whether or not each of the plurality of the frequencies is selected, and the second selection unit selects the at least one frequency based on a weighted sum of respective numerical value sequences of the plurality of the unit intervals.

14. A non-transitory machine readable medium containing a program for use in a computer having a processor for processing a plurality of observed signals at a plurality of frequencies, the plurality of the observed signals being produced by a plurality of sound receiving devices which receive a mixture of a plurality of sounds, and a storage that stores observed data of the plurality of the observed signals, the observed data representing a time series of magnitude of each frequency in each of the plurality of the observed signals, the program being executed by the processor to perform:

an index calculation process for calculating an index value from the observed data for each of the plurality of the frequencies, the index value indicating significance of learning of a separation matrix using the observed data of each frequency of the plurality of the frequencies and representing a total number of bases that are axis lines of regions in which observed vectors obtained from the observed data are distributed, each observed vector including, as elements, respective magnitudes of a corresponding frequency in the plurality of the observed signals, the separation matrix being used for separation of the plurality of the sounds;

a frequency selection process for selecting at least one frequency from the plurality of the frequencies according to the index value of each frequency calculated by the index calculation process by selecting one or more frequencies at which the total number of the bases represented by the index value is larger than a total number of bases represented by index values at other frequencies; and a learning process for determining the separation matrix by learning with a given initial separation. matrix using the observed data of the frequency selected by the frequency selection process among the plurality of the observed data stored in the storage.

* * * * *